United States Patent
Ohta

(10) Patent No.: US 7,831,064 B2
(45) Date of Patent: Nov. 9, 2010

(54) POSITION CALCULATION APPARATUS, STORAGE MEDIUM STORING POSITION CALCULATION PROGRAM, GAME APPARATUS, AND STORAGE MEDIUM STORING GAME PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1064 days.

(21) Appl. No.: 11/545,444

(22) Filed: Oct. 11, 2006

(65) Prior Publication Data
US 2007/0222750 A1 Sep. 27, 2007

(30) Foreign Application Priority Data
Mar. 23, 2006 (JP) .............................. 2006-081336

(51) Int. Cl.
*G06K 9/00* (2006.01)
*G06F 3/033* (2006.01)

(52) U.S. Cl. ...................................... 382/106; 345/158

(58) Field of Classification Search ................ 382/100, 382/104–106, 159, 164, 173, 181, 190, 276, 382/305; 701/96; 345/156–184; 180/170; 256/3–3.16; 348/113–114; 340/435–436, 340/907; 356/3–3.16
See application file for complete search history.

(56) References Cited

U.S. PATENT DOCUMENTS

| | | | |
|---|---|---|---|
| 5,309,137 A * | 5/1994 | Kajiwara | 340/436 |
| 5,319,387 A * | 6/1994 | Yoshikawa | 345/179 |
| 5,574,479 A | 11/1996 | Odell | |
| 5,627,565 A | 5/1997 | Morishita et al. | |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |

(Continued)

FOREIGN PATENT DOCUMENTS

JP  11-305935  11/1999

OTHER PUBLICATIONS

Machine translation of Patent abstract of Japan for Publication No. 11-305935 published on May 11, 1999, Sakai Masaru, Ura Shigenori "Position Detection System", Application No. 10-153534, pp. 1-15.*

(Continued)

*Primary Examiner*—Samir A. Ahmed
*Assistant Examiner*—Mehdi Rashidian
(74) *Attorney, Agent, or Firm*—Nixon & Vanderhye P.C.

(57) ABSTRACT

A position calculation apparatus calculates a positional relationship between an image pickup device, which is for taking an image of first and second imaging targets, and at least one of the first and second imaging targets. The position calculation apparatus obtains a first size, which indicates a size of a target image of the first imaging target in the image taken by the image pickup device, and a second size which indicates a size of a target image of the second imaging target in the image taken by the image pickup device. Then, based on the first and second sizes, the position calculation apparatus calculates the positional relationship between the image pickup device and the first and second imaging targets.

30 Claims, 18 Drawing Sheets

U.S. PATENT DOCUMENTS

| | | | |
|---|---|---|---|
| 7,545,956 B2 * | 6/2009 | Miyahara | 382/106 |
| 7,672,543 B2 * | 3/2010 | Hull et al. | 382/305 |
| 2004/0174340 A1 * | 9/2004 | Bruneau et al. | 345/167 |
| 2005/0052415 A1 * | 3/2005 | Braun et al. | 345/161 |
| 2005/0137774 A1 * | 6/2005 | Rupp | 701/96 |
| 2005/0244034 A1 * | 11/2005 | Miyahara | 382/106 |
| 2007/0211027 A1 * | 9/2007 | Ohta | 345/158 |

OTHER PUBLICATIONS

ADXL202 Specification Sheet: Low Cost ±2 g Dual Axis i MEMs® Accelerometer with Digital Output; Analog Devices, Inc., 1998.

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http:// www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using The XWand"; Robotics Institute; Carnegie Mellon University; tech report CMU-RI-TR-04-57; Apr. 2004.

Wilson, Andy, "XWand: UI for Intelligent Environments", Apr. 26, 2004; retrieved May 12, 2009 from http://research.microsoft.com/en-us/um/people/awilson/wand/default.htm.

Wilson, Andrew, et al.; "XWand: UI for Intelligent Spaces", Microsoft Research; CHI 2003, Apr. 5-10, 2003; Ft, Lauderdale, FL.

Selectech Air Mouse, Description; retrieved on May 5, 2009 from http://cgi.ebay.com.my/ws/eBaylSAPI.dll?ViewItem &Item=350096666675&indexURL.

* cited by examiner

F I G. 1
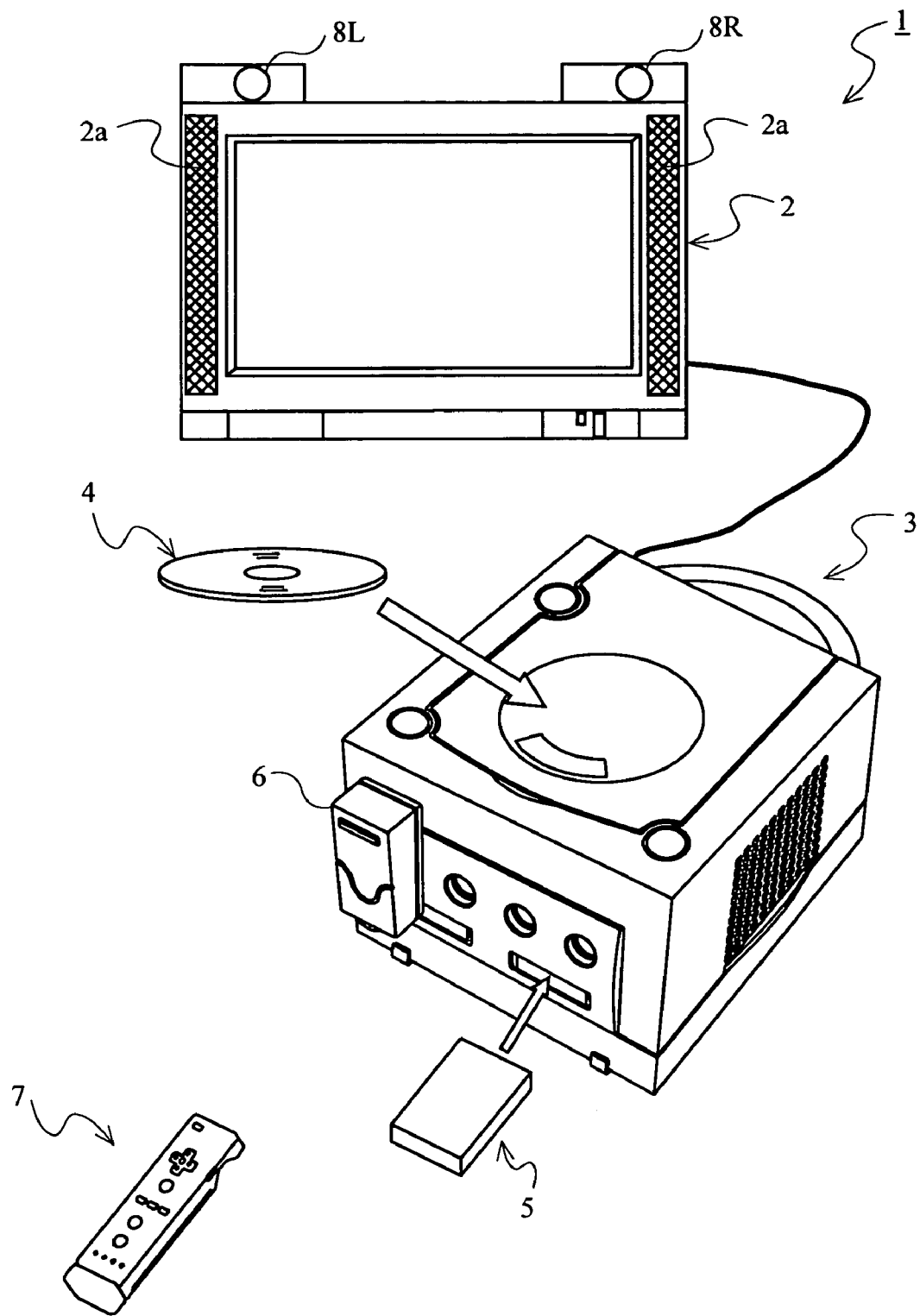

F I G. 4
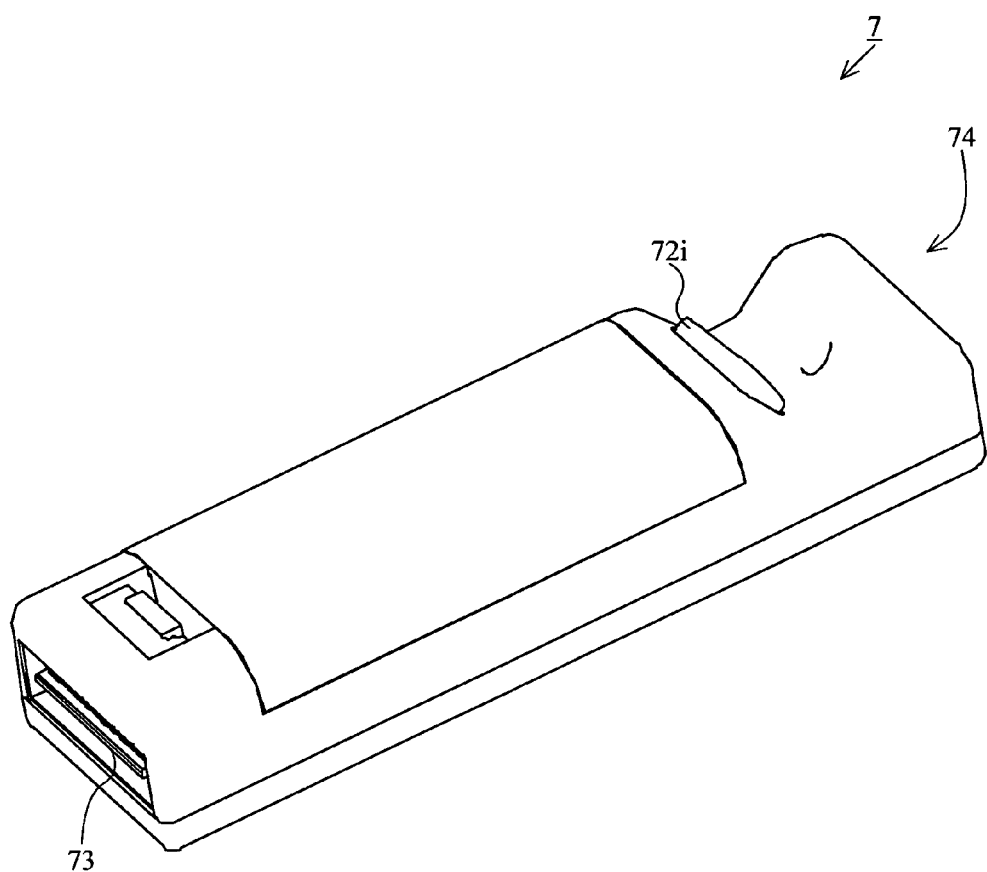

F I G. 1 8
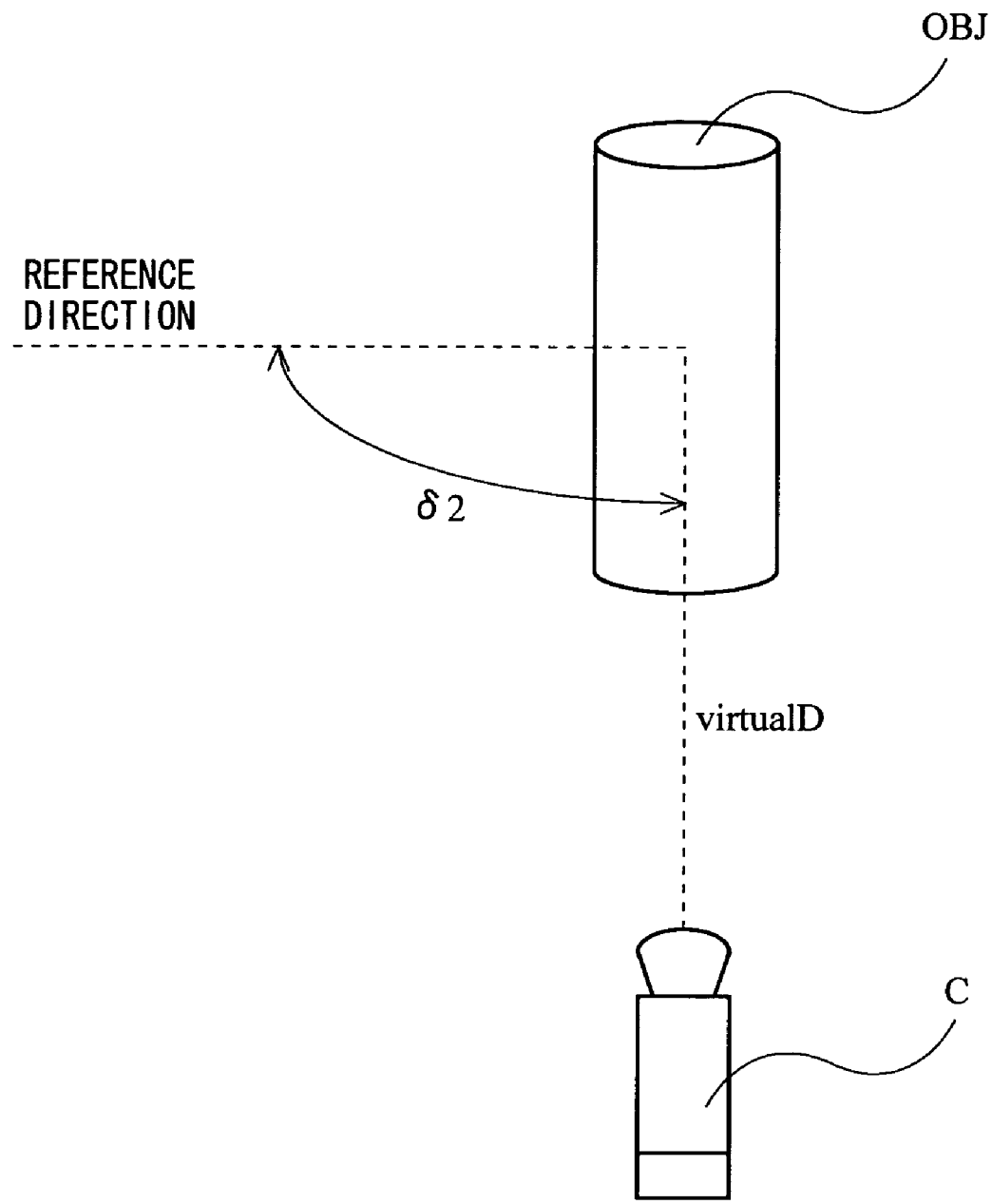

FIG. 19
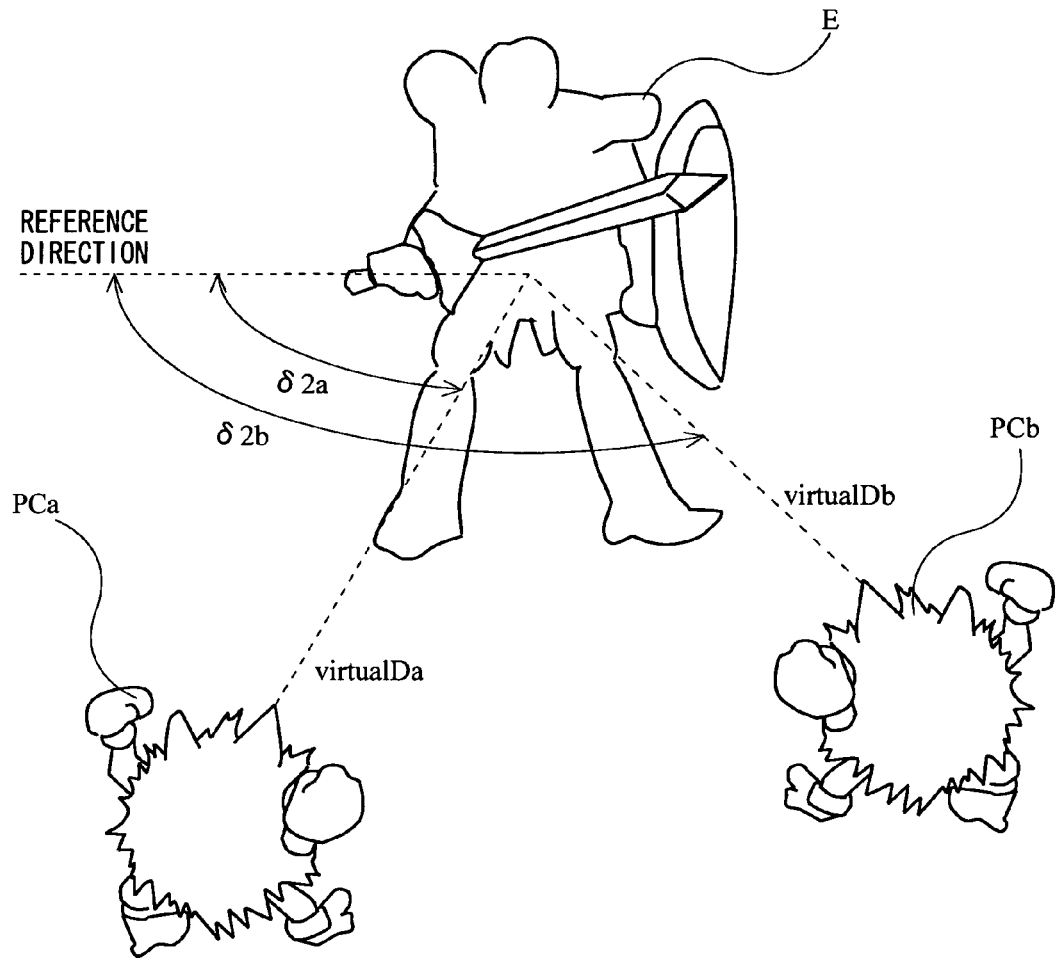
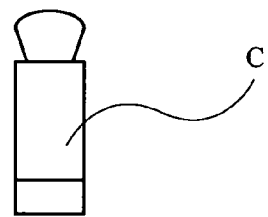

POSITION CALCULATION APPARATUS, STORAGE MEDIUM STORING POSITION CALCULATION PROGRAM, GAME APPARATUS, AND STORAGE MEDIUM STORING GAME PROGRAM

CROSS REFERENCE TO RELATED APPLICATION

The disclosure of Japanese Patent Application No. 2006-081336, filed on March 23, is incorporated herein by reference.

TECHNICAL FIELD

The exemplary embodiments disclosed herein relate to a position calculation apparatus, a storage medium storing a position calculation program, a game apparatus, and a storage medium storing a game program, and particularly to a position calculation apparatus for calculating a position of an input device having image pickup means, a storage medium storing a position calculation program, a game apparatus for performing a process in accordance with a result obtained from calculating the position of the input device, and a storage medium storing a game program.

BACKGROUND AND SUMMARY

There have been disclosed position detection systems, in which a light source of an infrared light is used as a marker whose image is taken by an image pickup device, and the taken image is analyzed to obtain a position and direction of the image pickup device. One of such systems is disclosed in, e.g., Japanese Laid-Open Patent Publication No. 11-305935 (hereinafter, referred to as a patent document 1).

The patent document 1 discloses a game as an embodiment of a position detection system in which a player uses, as a game controller, a gun having an image pickup device mounted thereon, and performs shooting. In the system, four light sources each emitting an infrared light, which are respectively fixed on four corners of a display screen, are used as markers, and a position on the display screen pointed by the gun is detected based on positions of the markers in an image taken by the image pickup device. Then, a virtual shooting game is executed by using the position pointed by the gun as a position aimed at by the player. As disclosed in the 15th paragraph of the patent document 1, in the case where two markers are used, a distance between the position aimed at by the player and each marker can be obtained if an axis of the image pickup device and an axis of said each marker are in parallel.

However, in the case where the two markers are used in the position detection system disclosed in the above patent document 1, the distance between the position aimed at by the player and each marker cannot be obtained if the axis of the image pickup device and the axis of said each marker are not in parallel.

Therefore, a feature of certain exemplary embodiments is to provide a position calculation apparatus, a storage medium storing a position calculation program, a game apparatus, and a storage medium storing a game program which are, when calculating a distance between an input device having an image pickup device and two imaging targets, capable of calculating a positional relationship between the input device and the two imaging targets even if the image pickup device is diagonally positioned with respect to the imaging targets.

Certain exemplary embodiments have the following aspects to attain the feature mentioned above. Note that reference numerals, step numbers (here, "step" is abbreviated as "S") and the like indicated between parentheses are merely provided to facilitate the understanding of certain exemplary embodiments in relation to the drawings and are not intended to be limiting in any way.

A first aspect relates to a position calculation apparatus (3) for calculating a positional relationship (realD, δ1, δ2) between an image pickup device (74), which is for taking an image of first and second imaging targets (8L, 8R), and at least one of the imaging targets. The position calculation apparatus comprises target image size obtaining means (S101) and positional relationship calculation means (S107). The target image size obtaining means is means for obtaining a first size (Da1), which indicates a size (diamL) of a target image of the first imaging target in the image taken by the image pickup device, and a second size (Da2), which indicates a size (diamR) of a target image of the second imaging target in the image taken by the image pickup device. The positional relationship calculation means is means for, based on the first and second sizes, calculating the positional relationship between the image pickup device and the at least one of the imaging targets. Note that, the target image size obtaining means may obtain the first and second sizes calculated by the image pickup device. Alternatively, the target image size obtaining means may calculate and obtain the first and second sizes from the taken image.

In a second aspect based on the first aspect, the positional relationship calculation means includes imaging target distance calculation means (S103, S105) for, based on the first size and an actual size (diamM) of the first imaging target which corresponds to the first size, calculating a first distance (realDL) between the image pickup device and the first imaging target, and for, based on the second size and an actual size (diamM) of the second imaging target which corresponds to the second size, calculating a second distance (realDR) between the image pickup device and the second imaging target. Based on the first and second distances and an actual setting distance (m) between the first and second imaging targets, the positional relationship calculation means calculates, as the positional relationship between the image pickup device and the at least one of the imaging targets, a positional relationship between the image pickup device and a predetermined point between the first and second imaging targets.

In a third aspect based on the second aspect, the positional relationship calculation means calculates, as the positional relationship, a distance (realD) between the image pickup device and a middle point between the first and second imaging targets.

In a fourth aspect based on the second aspect, the positional relationship calculation means calculates, as the positional relationship, a placement direction (δ2) which is a direction from the image pickup device to a middle point between the first and second imaging targets.

In a fifth aspect based on the second aspect, the positional relationship calculation means calculates, as the positional relationship, a placement direction (δ1) which is a direction from the image pickup device to one of the first and second imaging targets.

In a sixth aspect based on the third aspect, the positional relationship calculation means includes angle calculation means (S106) for, based on the first and second distances and the actual setting distance, calculating an angle (θ1) between a line connecting the first and second imaging targets and a line connecting the first imaging target and the image pickup device. Based on the angle, the first distance and a half length of the actual setting distance, the positional relationship calculation means calculates a distance between the middle point and the image pickup device.

In a seventh aspect based on the sixth aspect, by using the first distance, the half length of the actual setting distance, and the distance between the middle point and the image pickup device, the positional relationship calculation means further calculates, as the positional relationship, a placement angle ($\delta 2$) which is an angle between the line connecting the first and second imaging targets and a line connecting the middle point and the image pickup device.

An eighth aspect relates to a game apparatus (3) comprising the position calculation apparatus of the first aspect, game processing means (30) and display control means (32). The game processing means is means for, based on the positional relationship calculated by the positional relationship calculation means, performing a predetermined game process (FIGS. 17 to 19) for a virtual game world. The display control means is means for sequentially causing a display device (2) to display at least a portion of the virtual game world.

In a ninth aspect based on the eighth aspect, the game processing means determines, based on the positional relationship, a position of a virtual camera (C) placed in the virtual game world. The display control means sequentially causes the display device to display at least the portion of the virtual game world whose image is taken by the virtual camera (FIG. 18).

In a tenth aspect based on the eighth aspect, the game processing means determines, based on the positional relationship, a position of a predetermined object (PC) appearing in the virtual game world (FIG. 19).

In an eleventh aspect based on the eighth aspect, the image pickup device is provided in a single case (7, 71) together with a vibration generator (704) for, when actuated, generating predetermined vibration. The game processing means controls, based on the positional relationship, the vibration generated by the vibration generator.

Twelfth, thirteenth and fourteenth aspects relate to game apparatuses respectively comprising position calculation apparatuses of the fourth, fifth and seventh aspects, and each of the game apparatuses further comprises game processing means and display control means. In each of the twelfth, thirteenth and fourteenth aspects: the game processing means is means for performing a predetermined game process for a virtual game world; the display control means is means for sequentially causing a display device to display at least a portion of the virtual game world; the positional relationship calculation means calculates placement directions or placement angles for a plurality of image pickup devices, respectively; and the display control means divides a display area of the display device into a plurality of display areas, and based on the placement directions or placement angles, allocates the plurality of display areas to the plurality of image pickup devices, respectively (FIG. 17).

A fifteenth aspect relates to a game apparatus comprising the position calculation apparatus of the first aspect, game processing means, display control means and sound control means (34). The game processing means is means for performing a predetermined game process for a virtual game world. The display control means is means for sequentially causing a display device to display at least a portion of a virtual game world. The sound control means is means for causing a plurality of speakers (2a) to output sound in accordance with the predetermined game process performed by the game processing means. The sound control means controls, based on the positional relationship, volume of the sound outputted from the speakers.

A sixteenth aspect relates to a storage medium storing a position calculation program to be executed by a computer (30) which calculates a positional relationship between an image pickup device, which is for taking an image of first and second imaging targets, and at least one of the first and second imaging targets. The position calculation program causes the computer to perform a target image size obtaining step and a positional relationship calculation step. The target image size obtaining step is a step of obtaining a first size, which indicates a size of a target image of the first imaging target in the image taken by the image pickup device, and a second size, which indicates a size of a target image of the second imaging target in the image taken by the image pickup device. The positional relationship calculation step is a step of, based on the first and second sizes, calculating the positional relationship between the image pickup device and the at least one of the imaging targets.

In a seventeenth aspect based on the sixteenth aspect, the positional relationship calculation step includes an imaging target distance calculation step of, based on the first size and an actual size of the first imaging target which corresponds to the first size, calculating a first distance between the image pickup device and the first imaging target, and, based on the second size and an actual size of the second imaging target which corresponds to the second size, calculating a second distance between the image pickup device and the second imaging target. Based on the first and second distances and an actual setting distance between the first and second imaging targets, the positional relationship calculation step calculates, as the positional relationship between the image pickup device and the at least one of the imaging targets, a positional relationship between the image pickup device and a predetermined point between the first and second imaging targets.

In an eighteenth aspect based on the seventeenth aspect, at the positional relationship calculation step, a distance between the image pickup device and a middle point between the first and second imaging targets is calculated as the positional relationship.

In a nineteenth aspect based on the seventeenth aspect, at the positional relationship calculation step, a placement direction which is a direction from the image pickup device to a middle point between the first and second imaging targets is calculated as the positional relationship.

In a twentieth aspect based on the seventeenth aspect, at the positional relationship calculation step, a placement direction which is a direction from the image pickup device to one of the first and second imaging targets is calculated as the positional relationship.

In a twenty-first aspect based on the eighteenth aspect, the positional relationship calculation step includes an angle calculation step of, based on the first and second distances and the actual setting distance, calculating an angle between a line connecting the first and second imaging targets and a line connecting the first imaging target and the image pickup device. At the positional relationship calculation step, a distance between the middle point and the image pickup device is calculated based on the angle, the first distance, and a half length of the actual setting distance.

A twenty-second aspect based on the twenty-first aspect, at the positional relationship calculation step, a placement angle, which is an angle between the line connecting the first and second imaging targets and a line connecting the middle point and the image pickup device, is further calculated, as the positional relationship, based on the first distance, the half length of the actual setting distance, and the distance between the middle point and the image pickup device.

A twenty-third aspect based on the sixteenth aspect is a game program for causing the computer of the sixteenth aspect to perform: the steps which the position calculation program of the sixteenth aspect causes the computer to perform; a game processing step; and a display control step. The game processing step is a step of, based on the positional relationship calculated at the positional relationship calculation step, performing a predetermined game process for a virtual game world. The display control step is a step of sequentially causing a display device to display at least a portion of the virtual game world.

In a twenty-fourth aspect based on the twenty-third aspect, at the game processing step, a position of a virtual camera placed in the virtual game world is determined based on the positional relationship, and at the display control step, the display device is sequentially caused to display at least the portion of the virtual game world whose image is taken by the virtual camera.

In a twenty-fifth aspect based on the twenty-third aspect, at the game processing step, a position of a predetermined object appearing in the virtual game world is determined based on the positional relationship.

In a twenty-sixth aspect based on the twenty-third aspect, the image pickup device is provided in a single case together with a vibration generator for, when actuated, generating predetermined vibration, and at the game processing step, the vibration generated by the vibration generator is controlled based on the positional relationship.

A twenty-seventh aspect relates to a game program for causing the computer of the nineteenth aspect to perform the steps which the position calculation program of the nineteenth aspect causes the computer to perform; a twenty-eighth aspect relates to a game program for causing the computer of the twentieth aspect to perform the steps which the position calculation program of the twentieth aspect causes the computer to perform; and a twenty-nine aspect relates to a game program for causing the computer of the twenty-second aspect to perform the steps which the position calculation program of the twenty-second aspect causes the computer to perform. Further, the game programs of the twenty-seventh, twenty-eighth and twenty-ninth aspects respectively cause the computers of the nineteenth, twentieth and twenty-second aspects to each perform a game processing step and a display control step. In each of the twenty-seventh, twenty-eighth and twenty-ninth aspects: the game processing step is a step of performing a predetermined game process for a virtual game world; the display control step is a step of sequentially causing a display device to display at least a portion of the virtual game world; at the positional relationship calculation step, placement directions or placement angles are calculated for a plurality of image pickup devices, respectively; and at the display control step, a display area of the display device is divided into a plurality of display areas, and based on the placement directions or placement angles, the plurality of display areas are allocated to the plurality of image pickup devices, respectively.

A thirtieth aspect is a storage medium storing a game program for causing the computer of the sixteenth aspect to perform: the steps which the position calculation program of the sixteenth aspect causes the computer to perform; a game processing step; a display control step; and a sound control step. The game processing step is a step of performing a predetermined game process for a virtual game world. The display control step is a step of sequentially causing a display device to display at least a portion of a virtual game world. The sound control step is a step of causing a plurality of speakers to output sound in accordance with the predetermined game process performed at the game processing step. At the sound control step, volume of the sound outputted from the speakers is controlled based on the positional relationship.

According to the above first aspect, the positional relationship between the image pickup device and the imaging targets can be precisely calculated by using the sizes of the target images of the imaging targets in the taken image.

According to the above second aspect, even if there are two imaging targets, the positional relationship between the image pickup device and the predetermined point between the first and second imaging targets can be precisely calculated.

According to the above third aspect, even if the image pickup device is diagonally positioned with respect to a direction connecting the first and second imaging targets, the distance between the image pickup device and the middle point between the first and second imaging targets can be precisely calculated.

According to the fourth and fifth aspects, even if there are two imaging targets, a direction in which the image pickup device takes an image of the two imaging targets can be calculated.

According to the above sixth aspect, even if the image pickup device is diagonally positioned with respect to the direction connecting the two imaging targets, the distance between the image pickup device and the middle point between the first and second imaging targets can be precisely calculated by using a cosine theorem.

According to the above seventh aspect, even if the image pickup device is diagonally positioned with respect to the direction connecting the first and second imaging targets, a direction in which the image pickup device takes an image of the first and second imaging targets and the distance between the image pickup device and the middle point between the first and second imaging targets can be precisely calculated.

According to the above eighth aspect, by using the positional relationship between the image pickup device and the imaging targets for the game process, a new game operation input can be performed.

According to the above ninth aspect, by changing a direction in which the image pickup device takes the image of the imaging targets, a player is allowed to perform, e.g., an operation to move a viewpoint of the player in order to view a backside of an object displayed on the display device. Also, by moving the image pickup device back and forth with respect to the imaging targets, the player is allowed to perform, e.g., an operation to move the player's viewpoint close to or away from the displayed object. Thus, a viewing direction or position of the virtual camera is changed in accordance with the position of the image pickup device. This allows the player to have an operation feeling as if the player were moving the virtual camera by moving the controller 7.

According to the above tenth aspect, by changing the direction in which the image pickup device takes the image of the imaging targets, the player is allowed to perform, e.g., an operation to change an angle at which an object in a virtual game world faces another object in the virtual game world. Also, by moving the image pickup device back and forth with respect to the imaging targets, the player is allowed to perform, e.g., an operation to move an object in the virtual game world, which the player is controlling, close to or away from another object in the virtual game world. This allows the player to have an operation feeling as if the player were moving the object in the virtual world by moving the image pickup device.

According to the above eleventh aspect, the vibration generator is caused to generate vibration in accordance with a positional relationship between the image pickup device and a vibration source displayed on the display device, and the vibration is transmitted to the player's hand holding the case in which the vibration generator is provided. This allows the player to feel as if to have approached a real vibration source.

According to the above twelfth to fourteenth aspects, in accordance with the positional relationship between each of the plurality of image pickup devices and the imaging targets, the plurality of divided display areas can be respectively allocated to a plurality of players respectively operating the plurality of image pickup devices. For example, the plurality of divided display areas can be respectively allocated to the plurality of players in accordance with an order in which the players align in a row.

According to the above fifteenth aspect, the volume of the sound reproduced by the speakers can be adjusted in accordance with a viewing direction or viewing distance of a player operating the image pickup device.

The storage medium storing the position calculation program and the storage medium storing the game program according to certain exemplary embodiments produce same effects as those of the above-described position calculation apparatus and game apparatus when a computer executes these programs.

These and other features, aspects and advantages of the certain exemplary embodiments described herein will become more apparent from the following detailed description when taken in conjunction with the accompanying drawings.

BRIEF DESCRIPTION OF THE DRAWINGS

FIG. 1 is an external view illustrating a game system 1 according to an exemplary embodiment;

FIG. 4 is an isometric view of the controller 7 of FIG. 1 seen from a bottom rear side thereof;

FIG. 18 shows an example in which a position of a virtual camera C is changed in accordance with a position of the controller 7; and FIG. 19 shows an example in which positions of player characters PCa and PCb in a virtual world are changed in accordance with the position of the controller 7.

DETAILED DESCRIPTION

Figure 2:
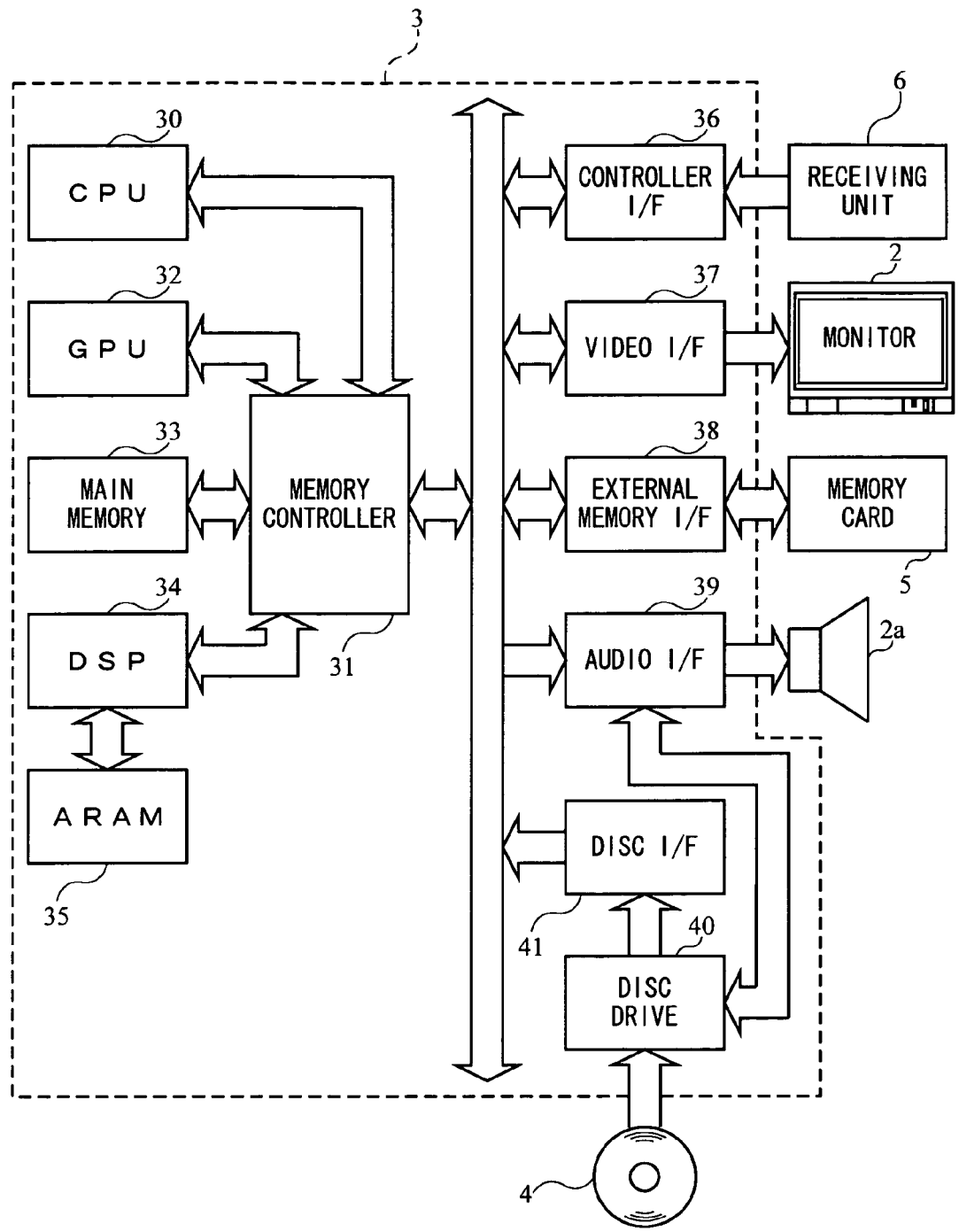
FIG. 2 is a functional block diagram of a game apparatus 3 shown in FIG. 1.

With reference to FIG. 1, a position calculation apparatus and a game apparatus according to one exemplary embodiment will be described. Hereinafter, in order to give a specific description, a game system 1 using a game apparatus functioning as the position calculation apparatus according to certain exemplary embodiments will be used as an example. FIG. 1 is an external view illustrating the game system 1. In the following description, the game system 1 uses a stationary game apparatus which is an example of the game apparatus and the position calculation apparatus according to the certain exemplary embodiments described herein.

As shown in FIG. 1, the game system 1 comprises a stationary game apparatus 3 (hereinafter, simply referred to as a "game apparatus 3") connected via a connection cord to a display 2 (hereinafter, referred to as a "monitor 2") such as a home-use TV receiver having speakers 2a, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by radio communication. On the game apparatus 3, an optical disc 4 as an example of an exchangeable information storage medium is detachably mounted. Provided on a top main surface of the game apparatus 3 are a power ON/OFF switch, a game process reset switch, and an OPEN switch for opening a top lid of the game apparatus 3. When a player presses the OPEN switch, the lid opens, thereby allowing the optical disc 4 to be mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4, and displays a result thereof as a game image on the monitor 2. It is assumed here that a position calculation program of certain exemplary embodiments is a part of the game program stored in the optical disc 4. The game apparatus 3 can also reproduce a state of a game played in the past, by using the saved data stored on the external memory card 5, and display on the monitor 2 a game image of the reproduced state. A player playing with the game apparatus 3 can enjoy the game by operating the controller 7 while watching the game image displayed on the monitor 2.

By using the technology of, for example, Bluetooth (registered trademark), the controller 7 wirelessly transmits the transmission data from a communication section 75 included therein (described later) to the game apparatus 3 connected to the receiving unit 6. The controller 7 is operation means for mainly operating a player object appearing in a game space displayed on the monitor 2. The controller 7 includes an operation section having a plurality of operation buttons, a key, a stick and the like. As described later in detail, the controller 7 also includes an imaging information calculation section 74 for taking an image viewed from the controller 7. As exemplary imaging targets of the imaging information calculation section 74, two LED modules 8L and 8R (hereinafter, referred to as "markers 8L and 8R") are provided in the vicinity of a display screen of the monitor 2. The markers 8L and 8R each output an infrared light forward from the monitor 2.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a boot program stored in a boot ROM (not shown) to, for example, initialize memories such as a main memory 33, and then executes a game program stored on the optical disc 4 to perform a game process or the like in accordance with the game program. The CPU 30 is connected via a memory controller 31 to a GPU (Graphics Processing Unit) 32, the main memory 33, a DSP (Digital Signal Processor) 34, and an ARAM (Audio RAM) 35. The memory controller 31 is connected via a predetermined bus to a controller I/F (interface) 36, video I/F 37, external memory I/F 38, audio I/F 39, and a disc I/F 41. The controller I/F 36, video I/F 37, external memory I/F 38, audio I/F 39 and the disc I/F 41 are respectively connected to a receiving unit 6, the monitor 2, the external memory card 5, the speakers 2a and a disc drive 40.

The GPU 32 performs image processing based on an instruction from the CPU 30. The GPU 32 includes, for example, a semiconductor chip for performing a calculation process necessary for displaying 3D graphics. The GPU 32 performs image processing by using a memory dedicated for image processing (not shown) and a part of a storage area of the main memory 33. The GPU 32 generates, by using such memories, game image data or moving images to be displayed on the monitor 2, and outputs the generated data or moving images to the monitor 2 via the memory controller 31 and video I/F 37 as necessary.

The main memory 33 is a storage area used by the CPU 30, which stores as necessary a game program or the like used for processes performed by the CPU 30. For example, the main memory 33 stores a game program read from the optical disc 4 by the CPU 30 and various types of data. The game program and the various types of data which are stored in the main memory 33 are executed by the CPU 30.

The DSP 34 processes sound data and the like generated by the CPU 30 during the execution of the game program. The DSP 34 is connected to the ARAM 35 for storing the sound data and the like. The ARAM 35 is used when the DSP 34 performs a predetermined process (for example, when the DSP 34 stores the game program or sound data which has been previously read). The DSP 34 reads the sound data stored in the ARAM 35, and outputs the sound data to the speakers 2a of the monitor 2 via the memory controller 31 and the audio I/F 39.

The memory controller 31 comprehensively controls data transfer, and is connected to the above-described various I/Fs. The controller I/F 36 includes, for example, four controllers I/F 36a to 36d, and communicably connects, by connectors of the controllers I/F 36a to 36d, the game apparatus 3 to an external device which is engageable with the connectors. For example, the receiving unit 6 is engaged with such connectors and is connected to the game apparatus 3 via the controller I/F 36. As described above, the receiving unit 6 receives the transmission data from the controller 7, and outputs the transmission data to the CPU 30 via the controller I/F 36. The video I/F 37 is connected to the monitor 2. The external memory I/F 38 is connected to the external memory card 5, thereby being able to access a backup memory or the like provided within the external memory card 5. The audio I/F 39 is connected to the speakers 2a built in the monitor 2, such that the sound data read by the DSP 34 from the ARAM 35 or sound data directly outputted from the disc drive 40 is outputted from the speakers 2a. The disc I/F 41 is connected to the disc drive 40. The disc drive 40 reads data stored in a predetermined reading position of the optical disc 4, and outputs the read data to the bus of the game apparatus 3 or the audio I/F 39.

Figure 3:
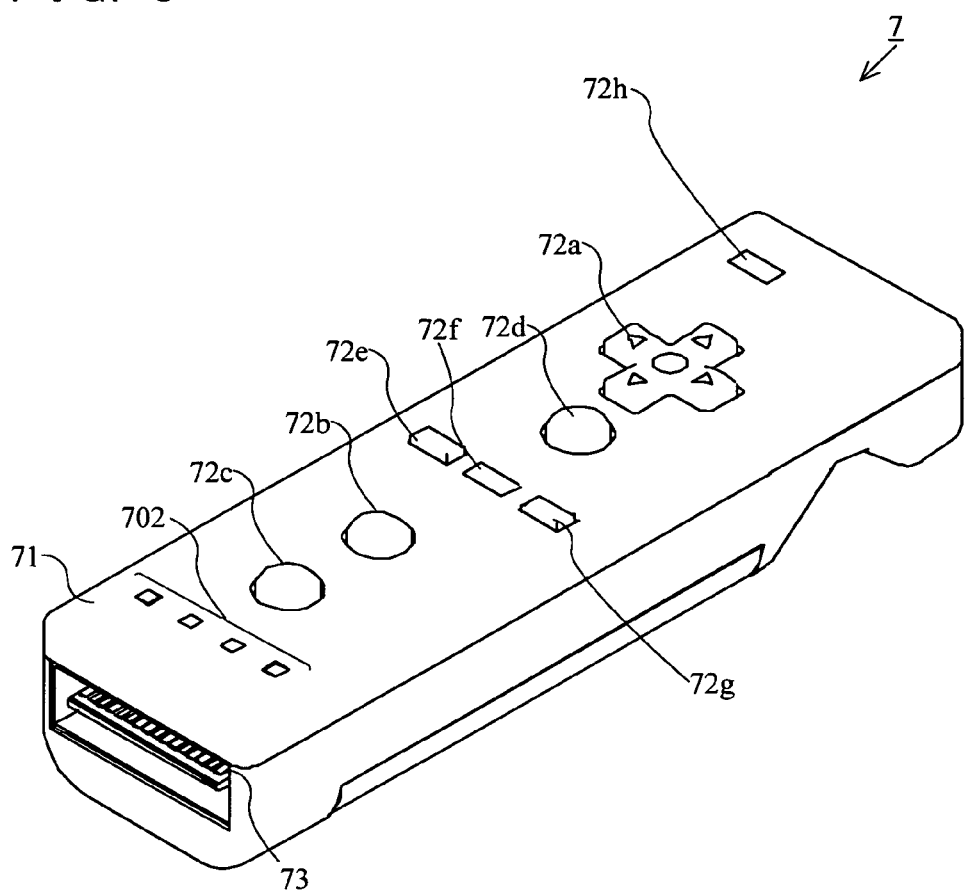
FIG. 3 is an isometric view of a controller 7 of FIG. 1 seen from a top rear side thereof.

With reference to FIGS. 3 and 4, the controller 7 will be described. FIG. 3 is an isometric view of the controller 7 seen from a top rear side thereof. FIG. 4 is an isometric view of the controller 7 seen from a bottom rear side thereof.

As shown in FIGS. 3 and 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions indicated by arrows (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or a direction in which a cursor is to move.

The cross key 72a is an operation section for outputting an operation signal in accordance with the above-described direction input operation performed by the player. Such an operation section may be provided in another form. For example, the cross key 72a may be replaced with a composite switch including a push switch having a ring-shaped four-direction operation section and a center switch provided at the center thereof. Alternatively, the cross key 72a may be replaced with an operation section which includes an inclinable stick projecting from a top surface of the housing 71 and which outputs an operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touch pad. Still alternatively, the cross key 72a may be replaced with an operation section which includes switches indicating at least four directions (front, rear, right and left) and which outputs an operation signal in accordance with any of the switches pressed by the player.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as an X button, a Y button and a B button are assigned to the operation buttons 72b to 72d. Also, functions as a select switch, a menu switch and a start switch are assigned to the operation buttons 72e to 72g, for example. Although various functions are assigned to the operation buttons 72b to 72g in accordance with the game program executed by the game apparatus 3, this will not be described in detail because the functions are not directly relevant to the certain exemplary embodiments described herein. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player about the controller type which is currently set for the controller 7. Specifically, when the controller 7 transmits the transmission data to the receiving unit 6, one of the plurality of LEDs 702 which corresponds to the controller type of the controller 7 is lit up.

On a bottom surface of the housing 71, a recessed portion is formed. As described later in detail, the recessed portion is formed in a position in which an index finger or middle finger of the player is located when the player holds the controller 7. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object. In a certain exemplary embodiment, the operation button 72i acts as a drag button for, e.g., grabbing an object displayed on the monitor 2. When the player presses the operation button 72i, an object displayed on the monitor 2 is grabbed.

On a front surface of the housing 71, an image pickup element 743 constituting a part of the imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, a 32-pin edge connector, and is used for engaging and connecting the controller 7 with a connection cable.

Figure 5A:
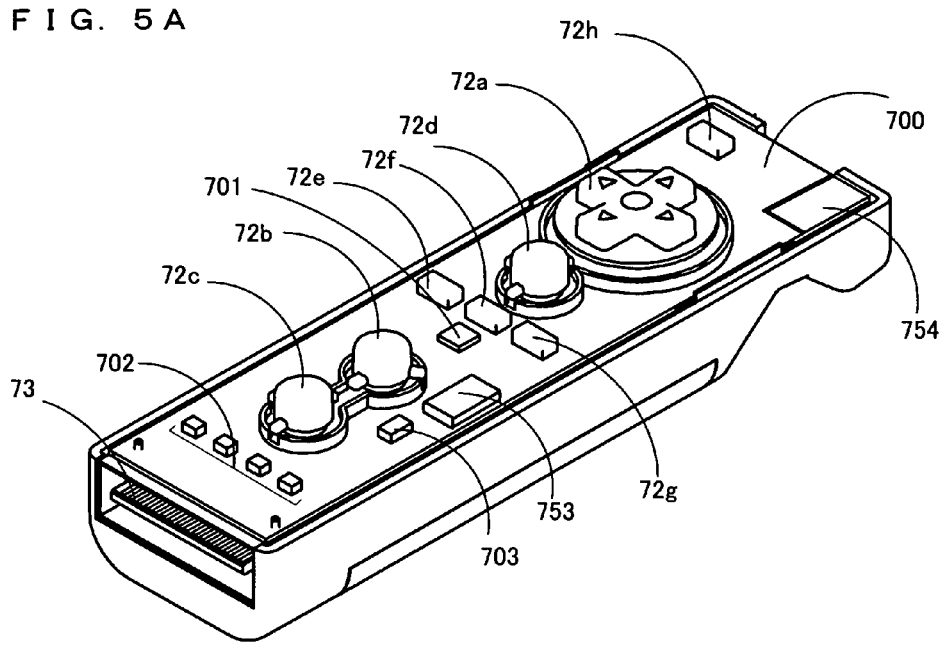
FIG. 5A is an isometric view illustrating a state where an upper casing of the controller 7 of FIG. 3 is removed.
Figure 5B:
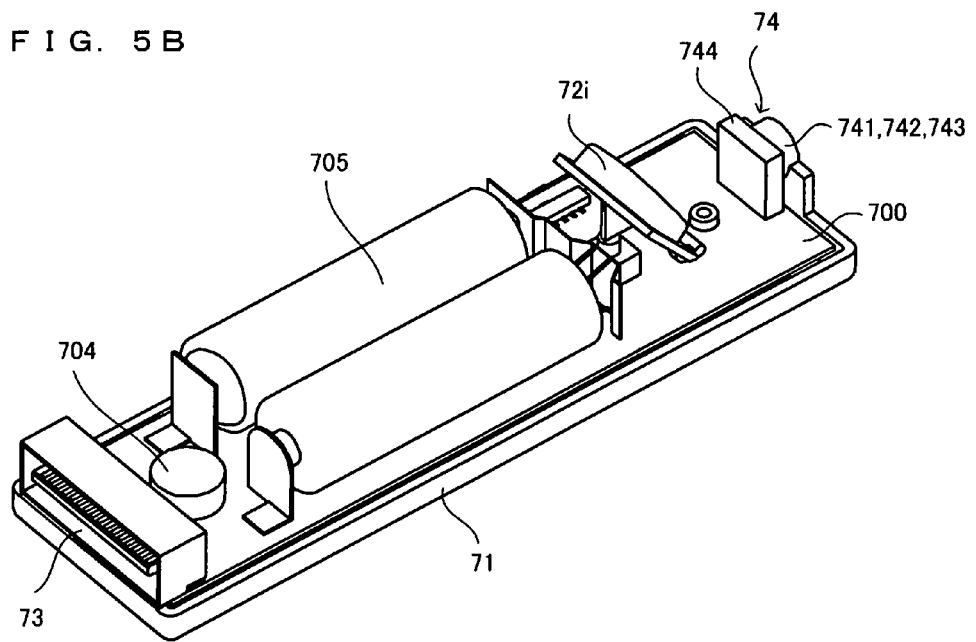
FIG. 5B is an isometric view illustrating a state where a lower casing of the controller 7 of FIG. 4 is removed.

With reference to FIGS. 5A and 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a to 72h, an acceleration sensor 701, the LEDs 702, a quartz oscillator 703, a wireless module 753, an antenna 754 and the like are provided. These elements are connected to a microcomputer 751 (see FIG. 6) by lines (not shown) formed on the substrate 700 and the like. The wireless module 753 and antenna 754 allow the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the image pickup element 743 and an image processing circuit 744 which are located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 behind the image information calculation section 74, and cells 705 are accommodated behind the operation button 72i. On the bottom main surface of the substrate 700 between the connector 73 and the cells 705, a vibrator 704 is attached. The vibrator 704 may be, for example, a vibration motor or a solenoid. The controller 7 is vibrated by an actuation of the vibrator 704, and vibration is conveyed to the player holding the controller 7. Thus, a so-called vibration-feedback game is realized.

Figure 6:
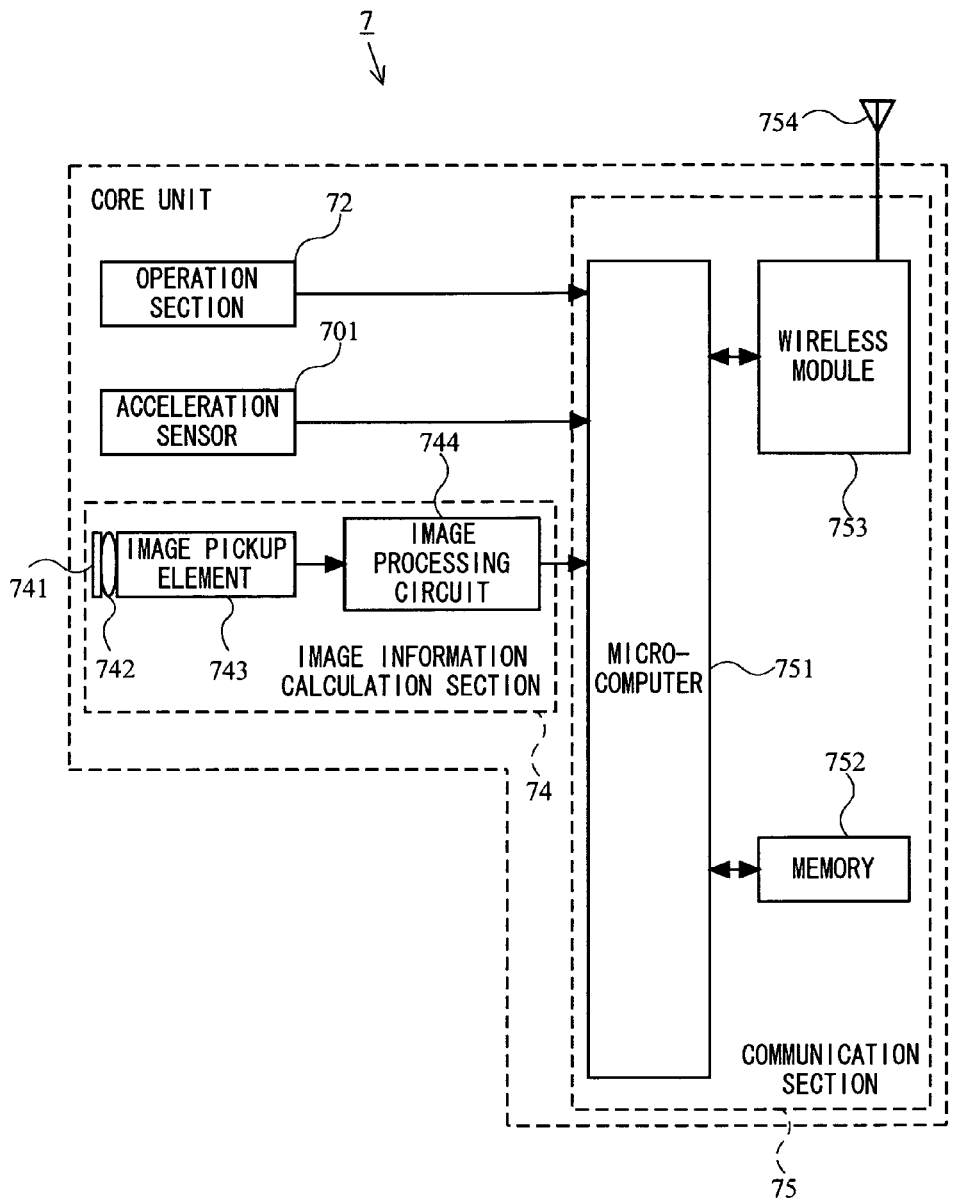
FIG. 6 is a block diagram showing an internal structure of the controller 7 of FIG. 3.

With reference to FIG. 6, an internal structure of the controller 7 will be described. FIG. 6 is a block diagram showing the internal structure of the controller 7.

As shown in FIG. 6, the controller 7 includes therein, in addition to the above-described operation section 72 and image information calculation section 74, the communication section 75 and acceleration sensor 701.

The imaging information calculation section 74 includes the infrared filter 741, lens 742, image pickup element 743 and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image which has a high brightness, and outputs, to the communication section 75, process result data indicating, e.g., a calculated coordinate position, square measure, diameter and a width of the area. The imaging information calculation section 74 is fixed to the housing 71 of the controller 7. An imaging direction of the imaging information calculation section 74 can be changed by changing a facing direction of the housing 71. As described later in detail, a signal corresponding to a position and motion of the controller 7 is obtained in accordance with the process result data outputted by the imaging information calculation section 74.

The acceleration sensor 701 detects acceleration of the controller 7 for three axial directions of the controller 7, i.e., an up-down direction, a left-right direction, and a front-rear direction of the controller 7. As the acceleration sensor 701, an acceleration sensor for detecting the acceleration of the controller 7 in two of the three axial directions, i.e., the up-down direction and left-right direction, or an acceleration sensor for detecting the acceleration of the controller 7 in one of the three axial directions may be alternatively used in accordance with a necessary type of the operation signal. Data indicating the acceleration detected by the acceleration sensor 701 is outputted to the communication section 75.

As a non-limiting example, such a one-axis, two-axis or three-axis acceleration sensor 701 may be of the type available from Analog Devices, Inc. or STMicroelectronics N.V. Preferably, the acceleration sensor 701 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the one-axis, two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along the one axis thereof or each of the two or three axes thereof. As a result, the acceleration sensor 701 cannot directly detect movement along a non-linear (e.g. arcuate) path, rotation, rotational movement, angular displacement, tilt, position, attitude or any other physical characteristic.

However, through additional processing of the linear acceleration signals outputted from the acceleration sensor 701, additional information relating to the controller 7 can be inferred or calculated, as one skilled in the art will readily understand from the description herein. For example, by detecting static, linear acceleration (i.e., gravitational acceleration), the linear acceleration output of the acceleration sensor 701 can be used to infer tilt of an object (controller 7) relative to the gravity vector by correlating tilt angles with detected linear acceleration. In this way, the acceleration sensor 701 can be used in combination with the microcomputer 751 (or another processor) to determine tilt, attitude or position of the controller 7. Similarly, various movements and/or positions of the controller 7 can be calculated or inferred through processing of the linear acceleration signals generated by the acceleration sensor 701 when the controller 7 including the acceleration sensor 701 is subjected to dynamic accelerations by, for example, the hand of a user, as explained herein. In another exemplary embodiment, the acceleration sensor 701 may include an embedded signal processor or other type of dedicated processor for performing any desired processing of the acceleration signals outputted from accelerometers therein prior to outputting signals to the microcomputer 751. For example, the embedded or dedicated processor could convert the detected acceleration signal to a corresponding tilt angle when the acceleration sensor is intended to detect static acceleration (i.e., gravitational acceleration).

In another exemplary embodiment, the acceleration sensor 701 may be replaced with a gyro-sensor of any suitable technology incorporating, for example, a rotating or vibrating element. Exemplary MEMS gyro-sensors that may be used in this exemplary embodiment are available from Analog Devices, Inc. Unlike the acceleration sensor 701, a gyro-sensor is capable of directly detecting rotation (or angular rate) around an axis defined by a gyroscopic element (or elements) therein. Thus, due to fundamental differences between a gyro-sensor and an acceleration sensor (e.g., angular-based output and vector-based output), corresponding changes need to be made to the processing operations that are performed on the output signals from these devices depending on which device is selected for a particular application. Since characteristics of a gyroscope as well as fundamental differences between an accelerometer and a gyroscope are well known by the one skilled in the art, further descriptions thereof will be omitted. Although the gyro-sensor has the advantage of being capable of directly detecting rotation, the acceleration sensor is generally a cost-effective option as compared with the gyro-sensor when used for the controller of this exemplary embodiment.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 such as an operation signal (key data) from the operation section 72, acceleration signals (acceleration data) from the acceleration sensor 701, and the process result data from the imaging information calculation section 74 are outputted to the microcomputer 751. The microcomputer 751 temporarily stores inputted data (the key data, acceleration data and process result data) in the memory 752 as the transmission data which is to be transmitted to the receiving unit 6. Radio transmission from the communication section 75 to the receiving unit 6 is performed at predetermined time intervals. Since the game process is generally performed at a cycle of 1/60 sec, the radio transmission needs to be performed at a cycle of a shorter time period. Specifically, the game process is performed at a cycle of 16.7 ms (1/60 sec), and a transmission interval of the communication section 75 structured using the Bluetooth (registered trademark) technology is 5 ms. At a timing of performing a radio transmission to the receiving unit 6, the microcomputer 751 outputs, to the wireless module 753, the transmission data stored in the memory 752 as a series of pieces of operation information. The wireless module 753 uses, for example, the Bluetooth (registered trademark) technology to radiate, with a carrier wave having a predetermined frequency, the series of pieces of operation information from the antenna 754 as a radio signal. Thus, the key data from the operation section 72, the acceleration data from the acceleration sensor 701, and the process result data from the imaging information calculation section 74 are transmitted from the controller 7. The receiving unit 6 of the game apparatus 3 receives the radio signal, and the game apparatus 3 demodulates or decodes the radio signal to obtain the series of pieces of operation information (the key data, acceleration data and process result data). In accordance with the series of pieces of obtained operation information and the game program, the CPU 30 of the game apparatus 3 performs the game process. In the case where the communication section 75 is structured using the Bluetooth (registered trademark) technology, the communication section 75 can have a function of receiving transmission data which is wirelessly transmitted from the other devices.

Figure 7:
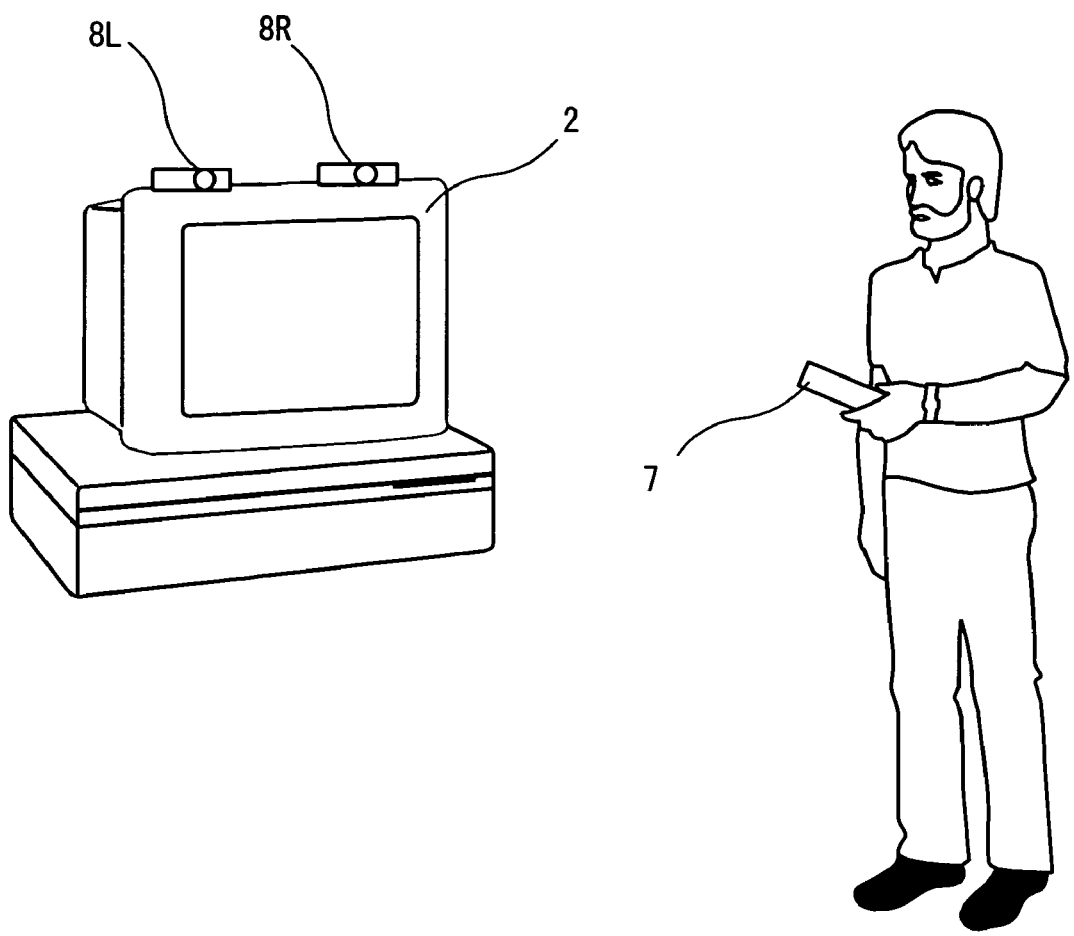
FIG. 7 is an illustration briefly showing a state where a player uses the controller 7 of FIG. 3 to perform game operations.
Figure 8:
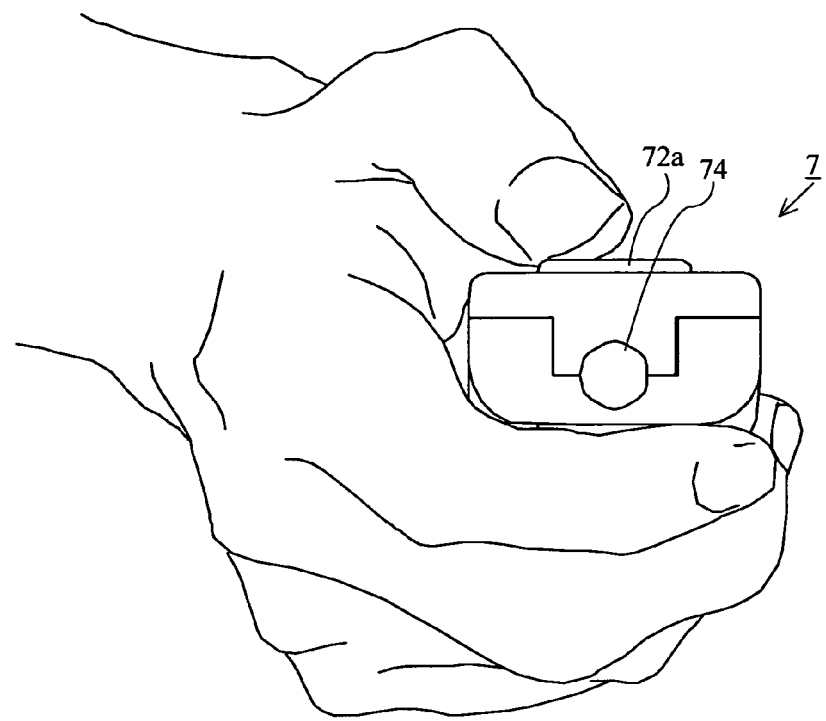
FIG. 8 shows an exemplary state of a player holding the controller 7 with a right hand as seen from a front surface side of the controller 7.

As shown in FIG. 7, in order to play a game with the game system 1 by using the controller 7, a player holds the controller 7 with one hand (for example, a right hand) (see FIGS. 8 and 9). The player holds the controller 7 so as to point the front surface of the controller 7 (that is, a side having an entrance through which a light is incident on the imaging information calculation section 74 taking an image of the light) to the monitor 2. Two markers 8L and 8R are provided in the vicinity of the display screen of the monitor 2. The markers 8L and 8R respectively output infrared lights forward from the monitor 2, and the infrared lights are used as imaging targets of the imaging information calculation section 74.

When a player holds the controller 7 so as to point the front surface thereof to the monitor 2, the infrared lights outputted from the two markers 8L and 8R are incident on the imaging information calculation section 74. The image pickup element 743 takes an image of the infrared lights which are incident on the image pickup element 743 through the infrared filter 741 and the lens 742, and the image processing circuit 744 processes the taken image. The imaging information calculation section 74 detects, from the taken image, infrared components outputted by the markers 8L and 8R so as to obtain positional information about the markers 8L and 8R (i.e., positions of target images in the taken image) and size information about the markers 8L and 8R such as a square measure, diameter and width thereof. Specifically, the image processing circuit 744 analyzes image data of the image taken by the image pickup element 743, and eliminates, from the size information about the taken image, information which is not about the infrared lights outputted by the markers 8L and 8R, and then identifies points each having a high brightness as positions of the markers 8L and 8R. The imaging information calculation section 74 obtains positional information which is information about a high brightness position such as the center of gravity of each of the identified points having a high brightness, and outputs the positional information as the process result data. Here, the positional information outputted as the process result data may be coordinate values indicating the brightness position, which are obtained by setting a predetermined reference point (for example, the center or the upper left corner of the taken image) in the taken image as a coordinate origin. Alternatively, the brightness position, which is previously identified at a predetermined timing, may be set as a reference point, and a vector indicating a positional difference between the reference point and the brightness position currently identified may be outputted as the process result data. That is, in the case where a predetermined reference point is set in the image taken by the image pickup element 743, the positional information about each of the target images in the taken image is a parameter indicating a positional difference from the predetermined reference point. When such positional information is transmitted to the game apparatus 3, the game apparatus 3 can obtain, based on a difference between a value representing the reference point and a value representing the positional information about each of the target images, an amount by which a signal changes in accordance with a motion, posture, position and the like of the imaging information calculation section 74 (i.e., the controller 7) with respect to the markers 8L and 8R. Specifically, the position of each point having a high brightness in the taken image, which is transmitted from the communication section 75, is changed in accordance with the motion of the controller 7, and a direction or coordinates corresponding to such a change of the position of each point having a high brightness is transmitted from the communication section 75. Upon receiving the direction or coordinates from the communication section 75, the game apparatus 3 recognizes and uses the direction or coordinates as an input from the communication section 75 which corresponds to a moving direction of the controller 7 in a three-dimensional space.

Also, the image information calculation section 74 obtains the size information indicating any of the square measure, diameter and width of each of the target images of the markers 8L and 8R in the taken image, thereby allowing the game apparatus 3 to analyze in detail the position of the controller 7 in 3D space. To be specific, even in the case where an image is taken by the image information calculation section 74 positioned diagonally from the markers 8L and 8R, i.e., even in the case where the player positioned diagonally from the monitor 2 operates the controller 7, the game apparatus 3 is able to obtain a distance between the controller 7 and the markers 8L and 8R. In an exemplary position calculation process described later, another form is also described in which the game apparatus 3 obtains as the process result data the size information in addition to the above-described center of gravity coordinates.

Thus, the imaging information calculation section 74 of the controller 7 takes images of the stationary markers (infrared lights from the two markers 8L and 8R in this exemplary embodiment), and the game apparatus 3 processes data outputted by the controller 7 during the game process. This enables an operation input to be performed in accordance with the motion, posture, position and the like of the controller 7. Therefore, an operation input, which is different from an operation input made by pressing an operation button or using an operation key, is intuitively performed. As described above, since the markers are provided in the vicinity of the display screen of the monitor 2, the motion, posture, position and the like of the controller 7 with respect to the display screen of the monitor 2 can be easily calculated based on positions of the controller 7 with respect to the markers. That is, the process result data used for obtaining the motion, posture, position and the like of the controller 7 can be used as operation inputs which directly affect an object displayed on the display screen of the monitor 2. Note that, in the game system 1, the distance between the controller 7 and the markers 8L and 8R, which is obtained by using the taken image of the markers 8L and 8R, can also be used as an operation input which directly affects an object displayed on the display screen of the monitor 2. This will be described later in detail.

Figure 9:
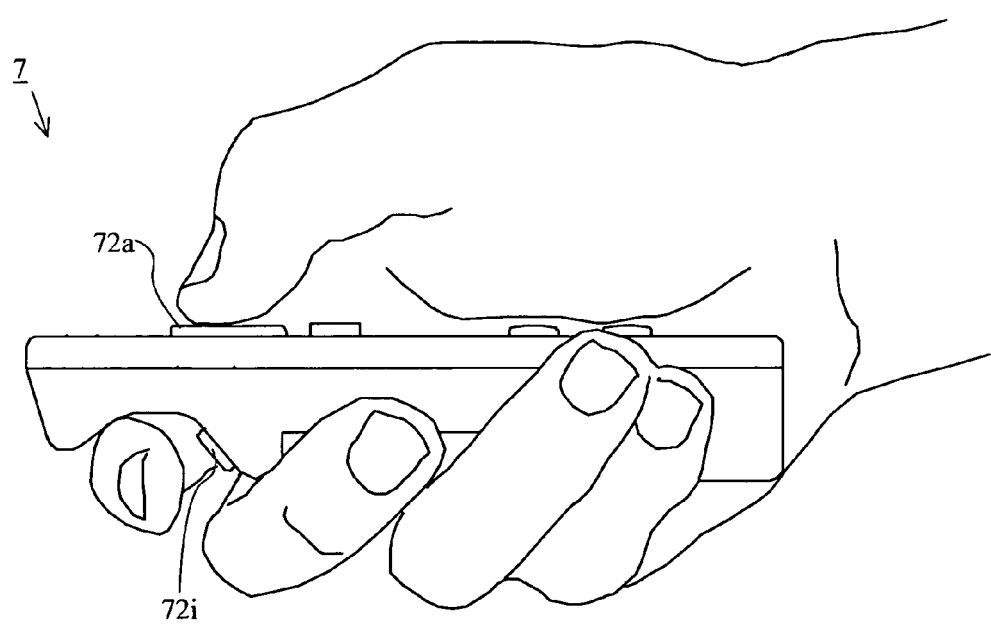
FIG. 9 shows an exemplary state of a player holding the controller 7 with a right hand as seen from a left side of the controller 7.

With reference to FIGS. 8 and 9, a state of a player holding the controller 7 with one hand will be described. FIG. 8 shows an exemplary state of a player holding the controller 7 with a right hand as seen from a front surface side of the controller 7. FIG. 9 shows an exemplary state of a player holding the controller 7 with a right hand as seen from a left side of the controller 7.

As shown in FIGS. 8 and 9, the overall size of the controller 7 is small enough to be held by one hand of an adult or even a child. When the player puts a thumb on the top surface of the controller 7 (for example, near the cross key 72a), and puts an index finger in the recessed portion on the bottom surface of the controller 7 (for example, near the operation button 72i), a light entrance of the imaging information calculation section 74 on the front surface of the controller 7 is exposed forward from the player. It should be understood that also when the player holds the controller 7 with a left hand, the holding state is same as that described for the right hand.

Thus, the controller 7 allows a player to easily operate the operation section 72 such as the cross key 72a or the operation button 72i while holding the controller 7 with one hand. Further, when the player holds the controller 7 with one hand, the light entrance of the imaging information calculation section 74 on the front surface of the controller 7 is exposed, whereby the light entrance can easily receive the infrared lights from the aforementioned two markers 8L and 8R. As a result, the player can hold the controller 7 with one hand without preventing the imaging information calculation section 74 of the controller 7 from functioning. That is, when the player moves his or her hand holding the controller 7 with respect to the display screen, the controller 7 can perform an operation input by which a motion of the player's hand directly affects a displayed object on the display screen.

Figure 10:
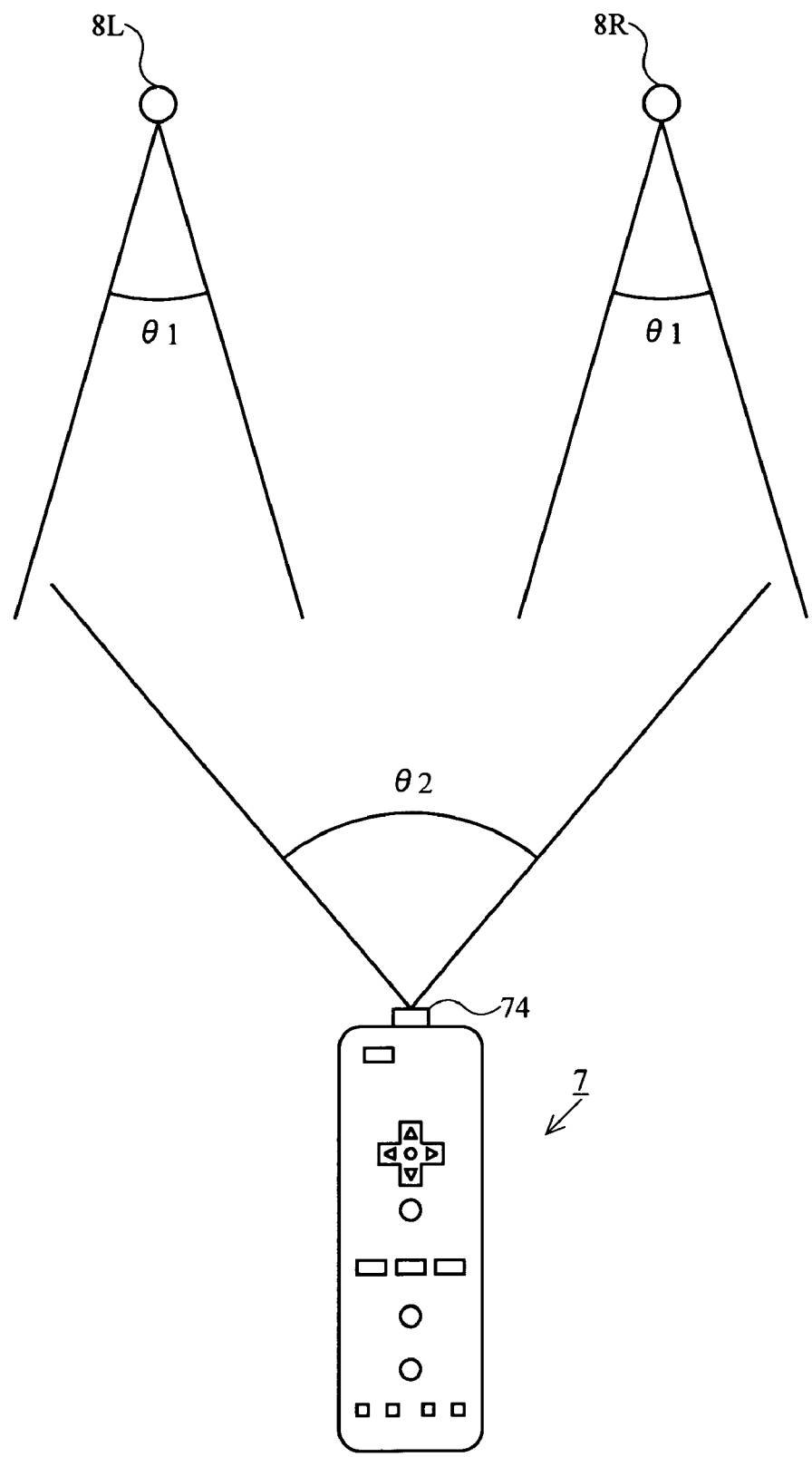
FIG. 10 illustrates viewing angles of an image information calculation section 74 and markers 8L and 8R.

As shown in FIG. 10, the markers 8L and 8R each have a viewing angle θ1. The image pickup element 743 has a viewing angle θ2. For example, each of the viewing angles θ1 of the markers 8L and 8R is 34 degrees (half-value angle), and the viewing angle θ2 of the image pickup element 743 is 41 degrees. When both the markers 8L and 8R are in the viewing angle θ2 of the image pickup element 743, and the image pickup element 743 is in the viewing angle θ1 of the marker 8L and the viewing angle θ1 of the marker 8R, the game apparatus 3 calculates a position of the controller 7 (including the distance between the controller 7 and the markers 8L and 8R) by using positional information and size information about points on the two markers 8L and 8R, the points each having a high brightness.

Figure 11:
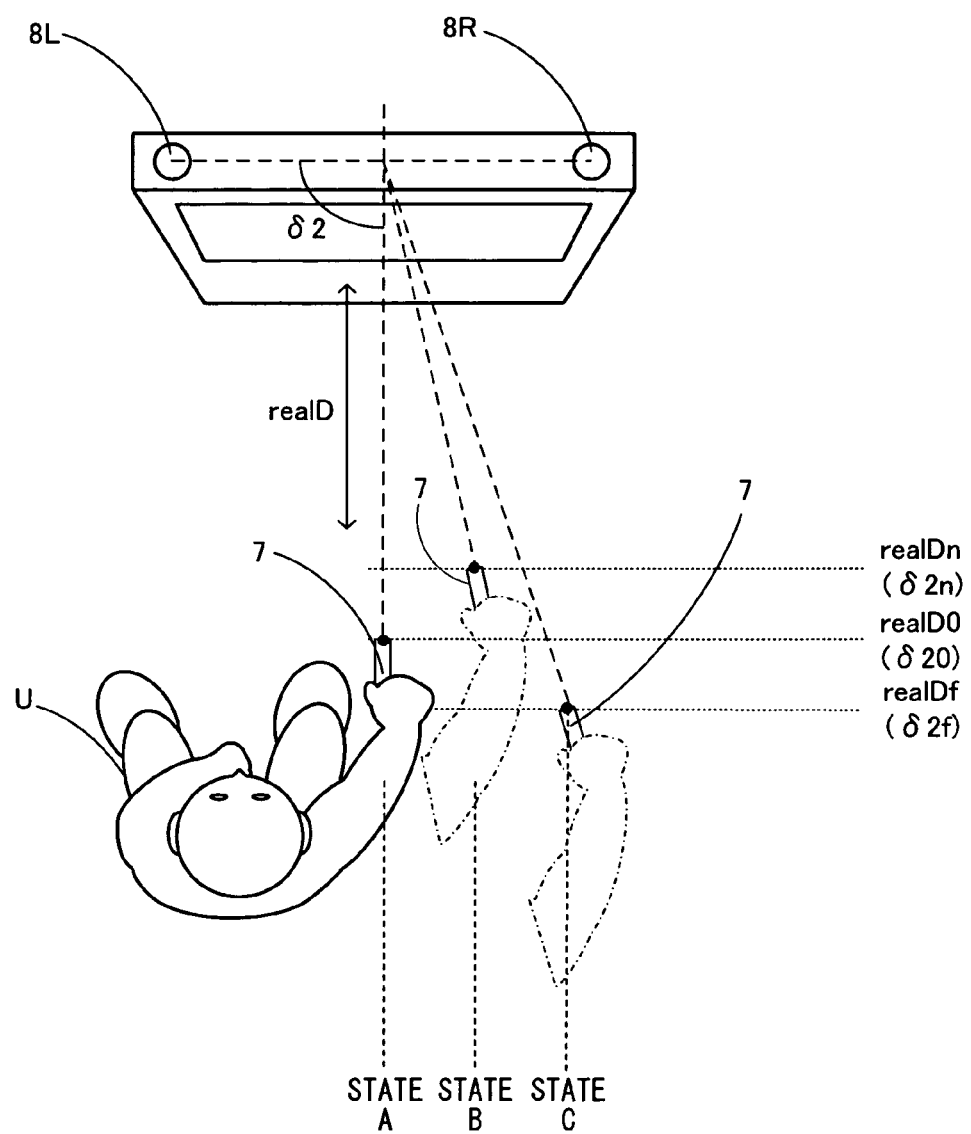
FIG. 11 is a top view showing an example in which a player U operates the controller 7 in a front-rear movement direction with respect to the markers 8L and 8R while changing an angle at which the controller 7 faces the markers 8L and 8R.

Described below with reference to FIG. 11 is an example in which a player operates the controller 7 in a front-rear movement direction with respect to the markers 8L and 8R while changing an angle at which the controller 7 faces the markers 8L and 8R. FIG. 11 is a top view showing an example in which a player U operates the controller 7 in a front-rear movement direction with respect to the markers 8L and 8R while changing an angle at which the controller 7 faces the markers 8L and 8R.

In FIG. 11, the player U holds the controller 7 so as to point the front face of the controller 7 to the markers 8L and 8R (i.e., to the monitor 2). Here, a distance between the front face of the controller 7 and a middle point between the markers 8L and 8R is referred to as a "distance realD", and an angle between a line connecting the markers 8L and 8R and a line connecting the middle point and the front face of the controller 7 is referred to as an angle δ2. In a state A shown in FIG. 11, the player U holds the controller 7 such that the distance realD is realD0 and the angle δ2 is δ20. The player U can change the distance realD and angle δ2, by moving the controller 7 back and forth with respect to the monitor 2 while changing an angle at which the controller 7 faces the monitor 2. For example, the player U facing the monitor 2 may move the controller 7 diagonally forward to the right, such that the distance realD changes from realD0 to realDn and the angle δ2 changes from δ20 to δ2n (state B). Also, the player U facing the monitor 2 may move the controller 7 diagonally backward to the right, such that the distance realD changes from realD0 to realDf and the angle δ2 changes from δ20 to δ2f (state C). By obtaining the distance realD and angle δ2, various operations can be performed based on a positional relationship between the controller 7 and the markers 8L and 8R.

Figure 12:
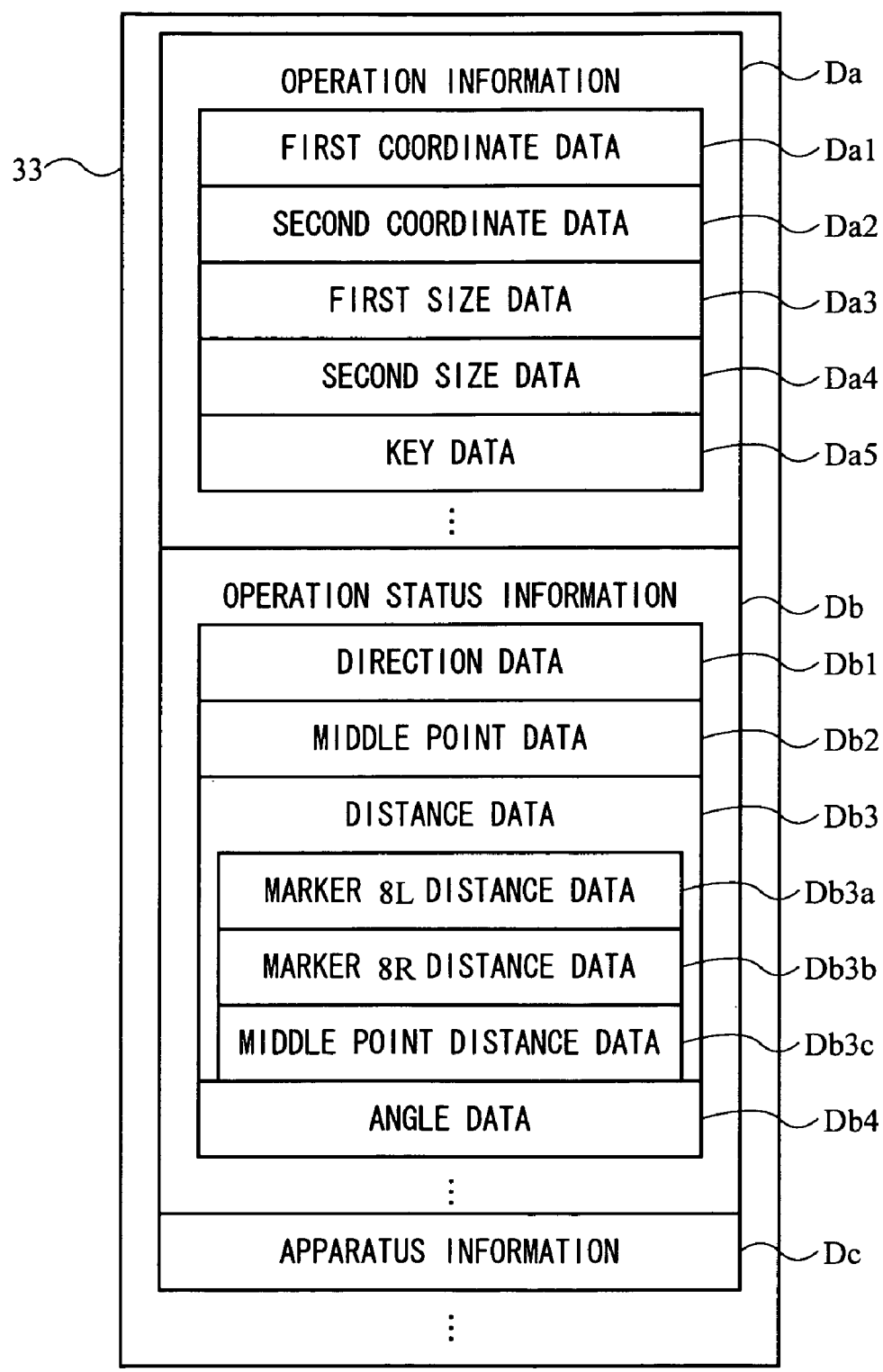
FIG. 12 shows main data stored in a main memory 33 of the game apparatus 3.

Next, the game process performed in the game system 1 will be described in detail. First, main data used for the game process will be described with reference to FIG. 12. FIG. 12 shows the main data used for the game process, which is stored in the main memory 33 of the game apparatus 3.

As shown in FIG. 12, the main memory 33 stores operation information Da, operation status information Db, apparatus information Dc and so on. In addition to data contained in the information shown in FIG. 12, the main memory 33 stores, as necessary, other data used for performing the game process.

The operation information Da is a series of pieces of operation information which are transmitted as transmission data from the controller 7. The operation information Da is information to be updated to latest operation information. The operation information Da contains first coordinate data Da1 and second coordinate data Da2 which correspond to the positional information of the above-described process result data. The first coordinate data Da1 is coordinate data indicating a position of one of the images of the two markers 8L and 8R in a image taken by the image pickup element 743. The second coordinate data Da2 is coordinate data indicating a position of the other of the images of the two markers 8L and 8R in the image taken by the image pickup element 743. The positions of the images of the markers are specified, for example, in a XY coordinate system on the taken image.

The operation information Da contains, in addition to the coordinate data (the first coordinate data Da1 and second coordinate data Da2) which is exemplary process result data obtained from the taken image, first size data Da3 and second size data Da4 which correspond to the above-described size information obtained as the process result data. The first size data Da3 indicates measurements, e.g., a square measure, diameter, width and the like of the target image of the marker 8L in the image taken by the image pickup element 743. The second size data Da4 indicates measurements, e.g., a square measure, diameter, width and the like of the target image of the marker 8R in the image taken by the image pickup element 743. In an example described below, the first size data Da3 indicates a diameter diamL of the target image of the marker 8L, and the second size data Da4 indicates a diameter diamR of the target image of the marker 8R. The operation information Da also contains key data Da5 and the like obtained from the operation section 72. Note that, the receiving unit 6 of the game apparatus 3 receives the operation information Da transmitted from the controller 7 at predetermined time intervals, e.g., every 5 ms, and stores the information Da in a buffer (not shown) of the receiving unit 6. Thereafter, the information Da is read, e.g., every frame (every 1/60 sec), which corresponds to a timing of performing the game process. The newly read information Da is stored in the main memory 33.

The operation status information Db is information about an operation status of the controller 7 which is recognized based on the taken image. The operation status information Db is data which is obtained from, e.g., a position, direction and size of each of the target images (markers) contained in the taken image. To be specific, the operation status information Db contains direction data Db1, middle point data Db2, distance data Db3, angle data Db4 and so on. The direction data Db1 indicates a direction from a point indicated by the first coordinate data Da1 to a point indicated by the second coordinate data Da2. It is assumed here that the direction data Db1 is a vector whose originating point is the point indicated by the first coordinate data Da1 and whose ending point is the point indicated by the second coordinate data Da2. The middle point data Db2 indicates coordinates of a middle point which is, in the taken image, between the point indicated by the first coordinate data Da1 and the point indicated by the second coordinate data Da2. When the images of the two markers (markers 8L and 8R) are seen as one target image, the middle point data Db2 indicates a position of the one target image.

The distance data Db3 contains marker 8L distance data Db3a, marker 8R distance data Db3d and middle point distance data Db3c. The marker 8L distance data Db3a indicates a distance realDL which is a distance between the marker 8L and the controller 7. The marker 8R distance data Db3b indicates a distance realDR which is a distance between the marker 8R and the controller 7. The middle point distance data Db3c indicates a distance realD which is a distance between the controller 7 and the middle point between the markers 8L and 8R. The angle data Db4 indicates an angle δ1 between a line connecting the marker 8L and the controller 7 and the line connecting the markers 8L and 8R.

The apparatus information Dc is preset information about, e.g., the markers 8L and 8R and the controller 7. For example, the apparatus information Dc contains pieces of data indicating fixed values such as a viewing angle θ of the image pickup element 743, a width wi of an image taken by the image pickup element 743, a setting distance m between the markers 8L and 8R and a size of each of the markers 8L and 8R (e.g., diameter diamM).

Figure 13:
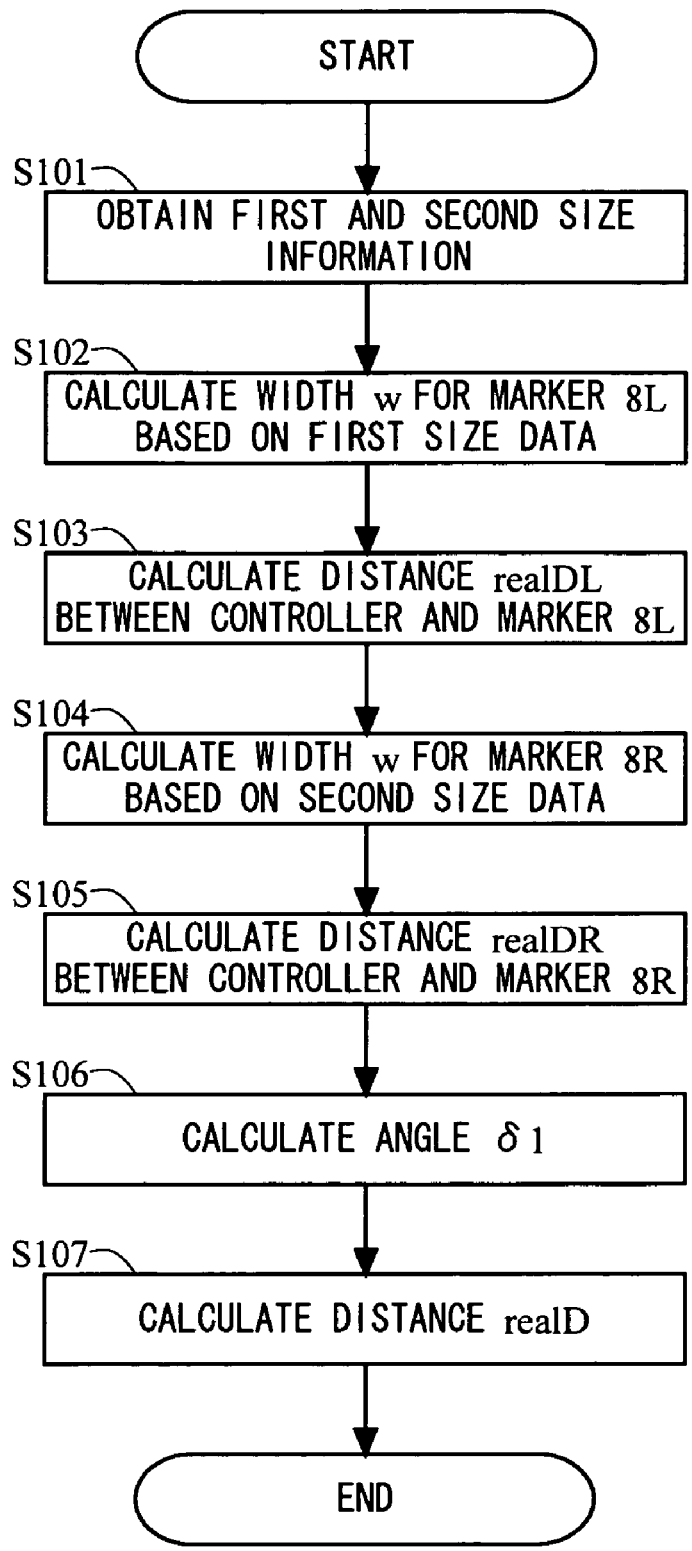
FIG. 13 is a flowchart showing a sequence of a position calculation process performed by the game apparatus 3.
Figure 14:
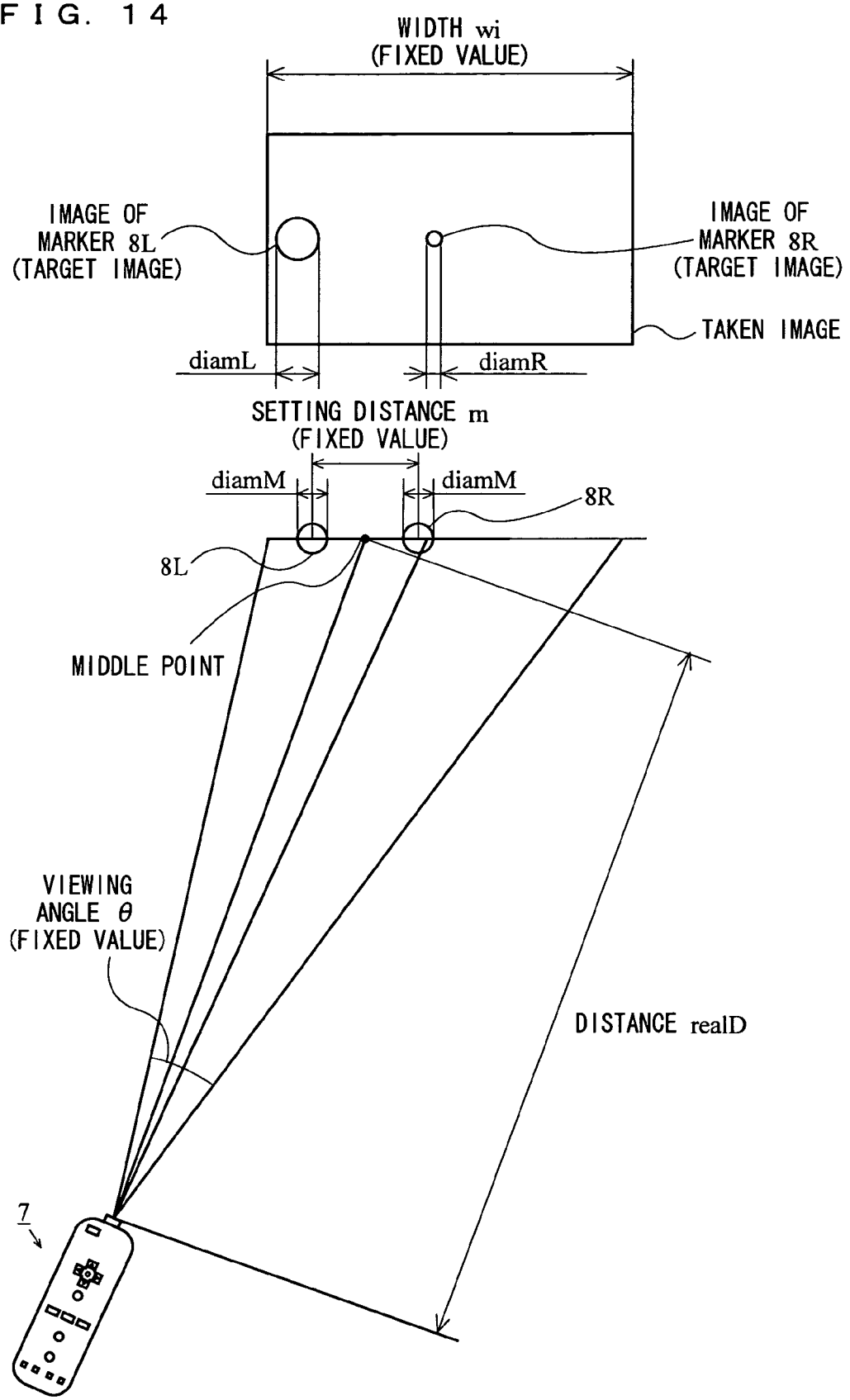
FIG. 14 is a diagram used to describe the position calculation process.
Figure 15:
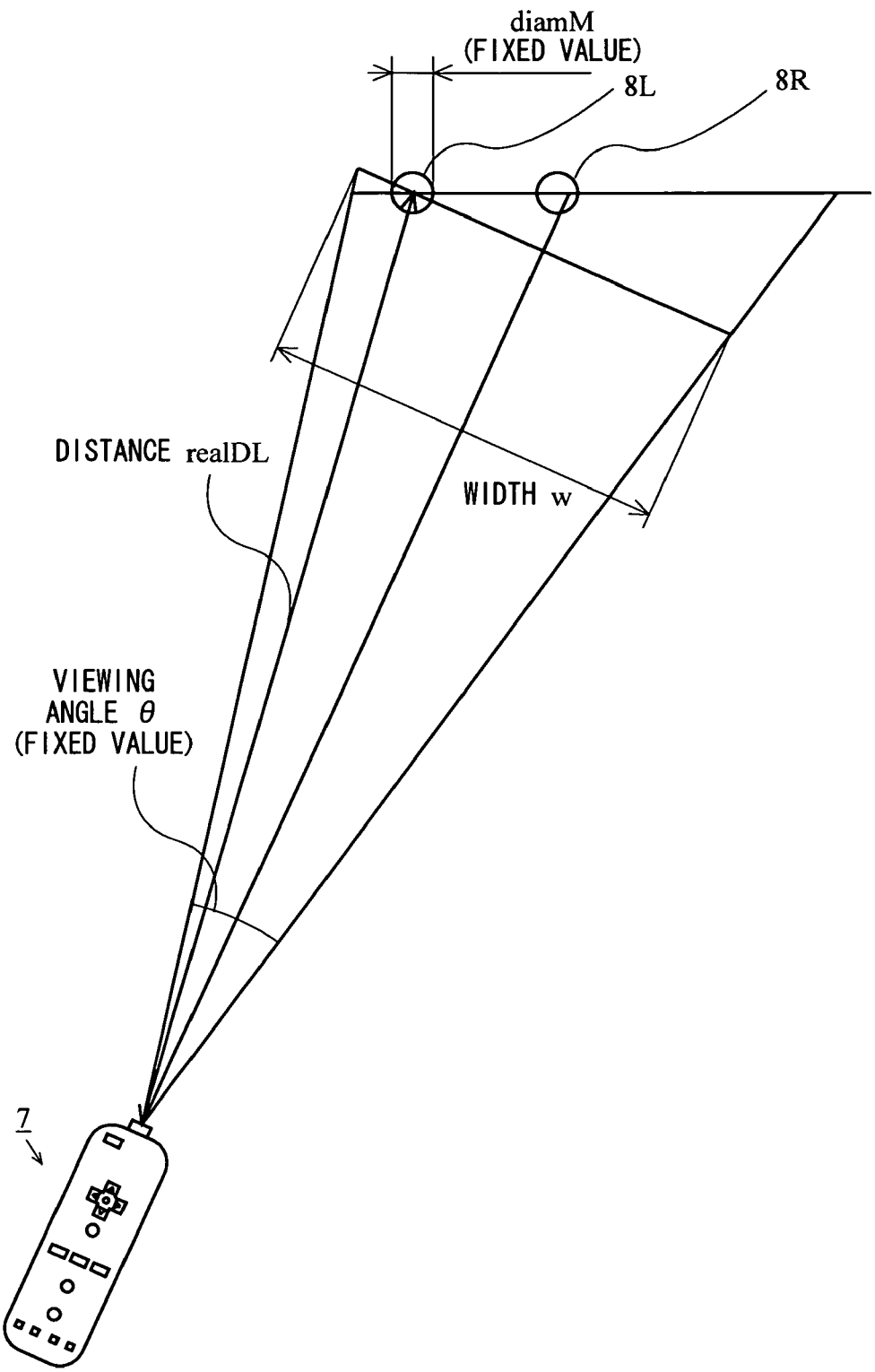
FIG. 15 is another diagram used to describe the position calculation process.
Figure 16:
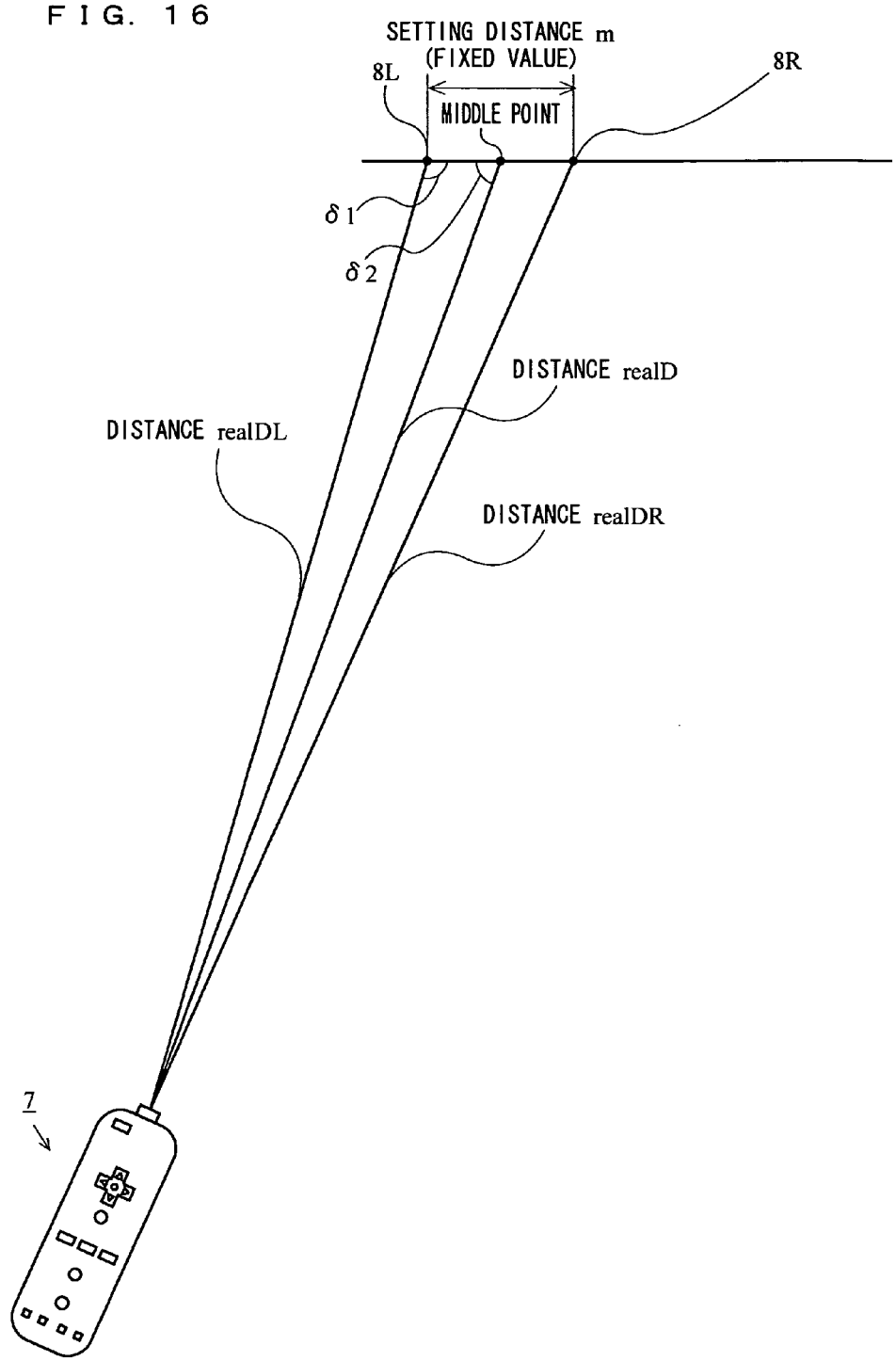
FIG. 16 is another further diagram used to describe the position calculation process.

Next, the position calculation process performed by the game apparatus 3 will be described in detail with reference to FIGS. 13 to 16. FIG. 13 is a flowchart showing a sequence of the position calculation process performed by the game apparatus 3. FIGS. 14 to 16 are diagrams used to describe the position calculation process. The flowchart of FIG. 13 shows, among a plurality of processes performed by the CPU 30, only a process for calculating a position of the controller 7 which is performed while the position calculation program contained in the game program is executed, and descriptions of the other processes which are not directly related to the certain exemplary embodiments described herein will be omitted. In FIG. 13, each step performed by the CPU 30 is abbreviated as "S".

When power is supplied to the game apparatus, the CPU 30 of the game apparatus 3 executes a boot program stored in a boot ROM (not shown), thereby initializing each unit such as the main memory 33. Then, after the game program stored in the optical disc 4 is loaded to the main memory 33, the CPU 30 starts executing the game program. The flowchart shown in FIG. 13 illustrates processes which are performed after such a boot process is completed.

As shown in FIG. 13, the CPU 30 first obtains the first size data Da3 and second size data Da4 from operation information received from the controller 7 (step 101), and proceeds to the next step. As shown in FIG. 14, the first size data Da3 indicates a size of the target image of the marker 8L, and the second size data Da4 indicates a size of the target image of the marker 8R. The first size data Da3 indicates the diameter diamL of the target image of the marker 8L, and the second size data Da4 indicates the diameter diamR of the target image of the marker 8R. Note that, when the controller 7 is diagonally positioned with respect to a direction connecting the markers 8L and 8R, an error occurs in each of the diameters diamL and diamR.

The operation information obtained at step 101 contains, in addition to the first size data Da3 about the marker 8L and the second size data Da4 about the marker 8R, coordinate data indicating positions of the markers 8L and 8R in the taken image (the first coordinate data Da1 and second coordinate data Da2) and data indicating a manner in which the operation section 72 of the controller 7 has been operated (key data Da5). It is assumed here that the communication section 75 transmits the operation information to the game apparatus 3 at predetermined time intervals (e.g., every 5 ms), and that the CPU 30 uses the operation information every frame. Accordingly, an iteration of processes at steps 101 to 107 shown in FIG. 13 is repeatedly performed every frame.

Based on the first size data (diameter diamL), the CPU 30 calculates a width w (see FIG. 15) which indicates, with respect to a setting position of the marker 8L, a width for which the image pickup element 743 is able to take an image (step 102). The width w is obtained from the following equation.

$$w = wi \times diamM / diamL$$

Here, diamM is a diameter (actual diameter) of each of the markers 8L and 8R, and contained in the apparatus information Dc as a fixed value.

Next, by using the width w calculated at step 102 and a viewing angle θ of the image pickup element 743, the CPU 30 calculates a distance realDL (see FIG. 15), which is a distance between the marker 8L and the image pickup element 743 (controller 7), and stores the distance realDL as the distance data Db3a (step 103). The distance realDL is obtained from the following equation.

$$realDL = (w/2) / \{\tan(\theta/2)\}$$

Here, the viewing angle θ is a fixed angle, and contained in the apparatus information Dc.

Next, based on the second size data Da4 (diameter diamR), the CPU 30 calculates another width w which indicates, with respect to a setting position of the marker 8R, a width for which the image pickup element 743 is able to take an image (step 104). Said another width w is obtained from the following equation.

$$w = wi \times diamM / diamR$$

Then, by using said another width w calculated at step 104 and the viewing angle θ of the image pickup element 743, the CPU 30 calculates a distance realDR between the marker 8R and the image pickup element 743 (controller 7), and stores the distance realDR as the distance data Db3b (step 105). Here, the distance realDR is obtained from the following equation.

$$realDR = (w/2) / \{\tan(\theta/2)\}$$

Thereafter, the CPU 30 calculates an angle δ1 by using the distance realDL, distance realDR and setting distance m between the markers 8L and 8R, and stores the angle δ1 as the angle data DB4 (step 106). As shown in FIG. 16, the angle δ1 is between a line connecting the marker 8L and controller 7 and a line connecting the markers 8L and 8R. The angle δ1 is obtained from the following equation based on the cosine theorem.

$$\cos \delta 1 = (realDL^2 \times m^2 - realDR^2) / (2 \times realDL \times m)$$

Subsequently, the CPU 30 calculates the distance realD (see FIG. 16) between the controller 7 and the middle point between the markers 8L and 8R, and stores the distance realD as the distance data Db3c (step 107). Then, the position calculation process shown in the flowchart ends. Here, the distance realD is obtained from the following equation based on the cosine theorem.

$$realD = \sqrt{realDL^2 + (m/2)^2 - 2 * realDL * (m/2) * \cos \delta 1} \quad \text{[equation 1]}$$

It is also possible to obtain an angle δ2 (see FIG. 16) between a line connecting the controller 7 and said middle point and the line connecting the markers 8L and 8R. The angle δ2 is obtained from the following equation based on the cosine theorem by using the distance realD, distance realDL and setting distance m.

$$\cos \delta 2 = \{realD^2 \times (m/2)^2 - realDL^2\} / \{2 \times realD \times (m/2)\}$$

Obtaining the angle δ2 allows the CPU 30 to calculate an angular position of the controller 7 with respect to the markers 8L and 8R, and various processes can be performed in accordance with the angular position of the controller 7.

The game apparatus 3 is capable of performing various processes by using the position of the controller 7 (i.e., the distance realD and angle δ2) obtained in the above-described manner. Hereinafter, exemplary processes, which are performed by the game apparatus 3 using the position of the controller 7, will be described.

Figure 17:
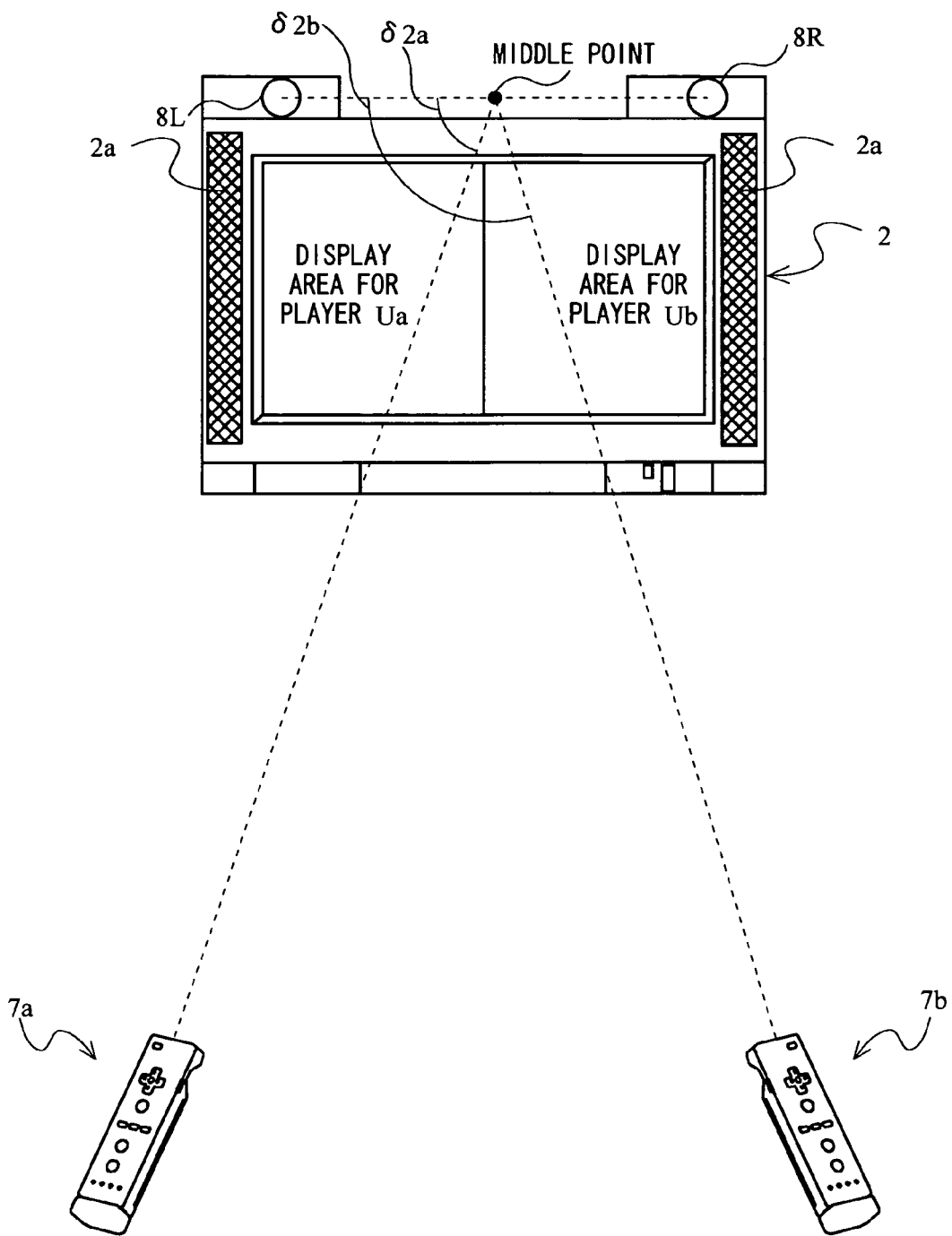
FIG. 17 shows an example in which a display area of the monitor 2 is divided when a player Ua using a controller 7a and a player Ub using a controller 7b operate the game apparatus 3.

A first exemplary process performed by the game apparatus 3 using the position of the controller 7 is described below in which a display area of the monitor 2 is divided in accordance with the position of the controller 7. FIG. 17 shows an example in which the display area of the monitor 2 is divided when a player Ua using a controller 7a and a player Ub using a controller 7b operate the game apparatus 3.

In the case where a plurality of players respectively use different controllers to operate a single game apparatus, a display area of a single monitor may be divided, such that the divided areas are respectively allocated to the players. For example, when the two players Ua and Ub operate the game apparatus 3, the display area of the monitor 2 is divided into two display areas, i.e., right and left display areas. These two areas are respectively allocated to the players Ua and Ub. Here, a player to whom the left display area is allocated may be fixedly predetermined, may be determined in accordance with an order in which the players perform operations, or may be selected by a particular button operation performed by a particular player.

As shown in FIG. 17, in the first exemplary process, display areas, which are to be respectively used by the players Ua and Ub operating the controllers 7a and 7b, are set in accordance with angles δ2 of the controllers 7a and 7b. In the example of FIG. 17, an angle δ2a, which is an angle between a line connecting the controller 7a and a middle point between the markers 8L and 8R and a line connecting the markers 8L and 8R, is calculated from first size data Da3 and second size data Da4 obtained from the controller 7a operated by the player Ua. Also, an angle δ2b, which is an angle between a line connecting the controller 7b and said middle point and the line connecting the markers 8L and 8R, is calculated from first size data Da3 and second size data Da4 obtained from the controller 7b operated by the player Ub (here, δ2b>δ2a).

Here, by comparing the calculated angles δ2a and δ2b, the game apparatus 3 can determine directions in which the controllers 7a and 7b are positioned with respect to the monitor 2. To be specific, since the angle δ2b is greater than the angle δ2a in the example of FIG. 17, the game apparatus 3 determines that the controller 7a is positioned on the left of the controller 7b when the controller 7a faces the monitor 2. In this case, the game apparatus 3 allocates, among the divided right and left display areas of the monitor 2, the left display area to the controller 7a (i.e., the player Ua), and allocates the right display area to the controller 7b (i.e., the player Ub). Accordingly, each of the players Ua and Ub uses, for his/her operation input, one of the divided display areas which is nearer to him/her than the other of the divided display areas.

In the above-described first exemplary process, two players operate the game apparatus 3. However, the certain exemplary embodiments described herein can be realized even if more than three players operate the game apparatus 3. In the case where n players respectively use n controllers 7 to operate a single game apparatus 3, and the display area of the monitor 2 is longitudinally divided into n display areas to be respectively allocated to the n players. In this case, the game apparatus 3 calculates the angles δ2 respectively for the n controllers 7, and in accordance with an ascending order of the angles δ2, allocates the divided display areas of the monitor 2 respectively to the n controllers 7 sequentially from, facing the monitor 2, the leftmost divided area. As a result, the divided display areas to be used by the n players are respectively allocated to the n players sequentially from, facing the monitor 2, the leftmost divided area to the rightmost divided area, in accordance with an order in which the n players facing the monitor 2 are positioned from left to right.

A second exemplary process performed by the game apparatus 3 using the position of the controller 7 is described below in which a virtual camera for generating a game image is moved in accordance with the position of the controller 7. FIG. 18 shows an example in which a position of a virtual camera C is changed in accordance with the position of the controller 7.

As shown in FIG. 18, the object OBJ is placed in a virtual world, and an image of the object OBJ is taken by the virtual camera C. The monitor 2 displays the taken image. It is assumed here that the game apparatus 3 has calculated, based on the first size data Da3 and second size data Da4 obtained from the controller 7, the angle δ2 which is the angle between the line connecting the controller 7a and the middle point between the markers 8L and 8R and the line connecting the markers 8L and 8R. Here, the game apparatus 3 moves the virtual camera C such that an angle between a predetermined reference direction and a viewing direction of the virtual camera C is the angle δ2 (as shown in FIG. 18). Accordingly, a direction in which the virtual camera C takes an image of the object OBJ is changed. As a result, a display direction of the object OBJ displayed on the monitor 2 is changed. Thus, by changing a direction in which the controller 7 takes an image of the markers 8L and 8R, the player is allowed to perform, e.g., an operation by which to move a viewpoint of the player in order to view the backside of the object OBJ. Since the viewing direction of the virtual camera C is changed in accordance with the position of the controller 7, the player is allowed to have an operation feeling as if the player were moving the virtual camera C by moving the controller 7.

Further, the virtual camera C may be moved in accordance with the distance realD obtained based on the first size data Da3 and second size data Da4 which are obtained from the controller 7. For instance, by using the following function, the game apparatus 3 calculates a virtual distance virtualD which is a virtual distance in the virtual world, the virtual distance virtualD corresponding to the distance realD which is an actual distance.

$$\text{virtual}D = P \times \text{real}D + Q$$

Here, P and Q are arbitrarily fixed numbers. Then, the game apparatus 3 moves the virtual camera C such that a distance between the object OBJ and the virtual camera C is the virtual distance virtualD. Accordingly, the distance between the object OBJ and the virtual camera C is changed. As a result, a display size of the object OBJ displayed on the monitor 2 is changed. In other words, by moving the controller 7 back and forth with respect to the markers 8L and 8R, the player is allowed to, e.g., perform an operation by which to move the viewpoint of the player in order to view the object OBJ closely or distantly. Further, by setting the fixed number P to a positive value, the player is allowed to have an operation feeling as if the player were moving the virtual camera C by moving the controller 7.

A third exemplary process performed by the game apparatus 3 using the position of the controller 7 is described below in which an object placed in the virtual world is moved in accordance with the position of the controller 7. FIG. 19 shows an example in which positions of player characters PCa and PCb in the virtual world are changed in accordance with the position of the controller 7.

As shown in FIG. 19, the player character PCa controlled by the controller 7a, the player character PCb controlled by the controller 7b and an enemy character E are placed in the virtual world. An image of these characters is taken by the virtual camera C, and the image is displayed on the monitor 2. It is assumed here that the game apparatus 3 has calculated, based on the first size data Da3 and second size data Da4 obtained from the controller 7a, the angle δ2a which is the angle between the line connecting the controller 7a and the middle point between the markers 8L and 8R and the line connecting the markers 8L and 8R, and that the game apparatus 3 has also calculated, based on the first size data Da3 and second size data Da4 obtained from the controller 7b, the angle δ2b which is the angle between the line connecting the controller 7b and said middle point and the line connecting the markers 8L and 8R (same positional relationships as those shown in FIG. 17). Here, the game apparatus 3 moves the player character PCa such that an angle between a direction connecting the player character PCa and the enemy character E and a predetermined reference direction is the angle δ2a. The game apparatus 3 also moves the player character PCb such that a direction connecting the player character PCb and enemy character E and the predetermined reference direction is the angle δ2b. Thus, by changing the direction in which the controller 7 takes the image of the markers 8L and 8R, the player is allowed to perform, e.g., an operation to change an angle at which a player character PC faces the enemy character E. This allows the player to have an operation feeling as if the player were moving the player character PC by moving the controller 7.

Further, the player characters PCa and PCb may be respectively moved in accordance with: a distance realDa which is obtained based on the first size data Da3 and second size data Da4 obtained from the controller 7a; and a distance realDb which is obtained based on the first size data Da3 and second size data Da4 obtained from the controller 7b. For example, by using the above-mentioned function, the game apparatus 3 calculates virtual distances virtualDa and virtualDb which are virtual distances in the virtual world, the virtual distances virtualDa and virtualDb respectively corresponding to the distances realDa and realDb which are actual distances. Then, the game apparatus 3 moves the player character PCa such that a distance between the player character PCa and the enemy character E is the virtual distance virtualDa, and also moves the player character PCb such that a distance between the player character PCb and the enemy character E is the virtual distance virtualDb. Thus, by moving the controller 7 back and forth with respect to the markers 8L and 8R, the player is allowed to perform, e.g., an operation to move a player character PC close to or away from the enemy character E. This, when combined with the above-described operation to move the player character PC in accordance with the angle δ2, allows the player operating the controller 7 to have an operation feeling as if the player were actually in the virtual world, facing the enemy character E.

As another exemplary process using the position of the controller 7, volume of sound from the speakers 2a may be changed in accordance with the position of the controller 7. As described above, by obtaining the angle δ2, the game apparatus 3 can calculate an angular position of the controller 7 with respect to the markers 8L and 8R, i.e., calculate an angle at which the controller 7 is positioned with respect to the speakers 2a respectively provided on right and left sides of the monitor 2. Accordingly, a balance of sound volume between the right and left speakers 2a may be adjusted in accordance with the angle δ2 (for example, volume of sound from one of the speakers 2a, which is more distant from the controller 7 than the other of the speakers 2a, may be adjusted to be louder than volume of sound from the other of the speakers 2a). This allows volume balance of stereo sound between the right and left speakers 2a to be appropriately adjusted based on a viewing direction of the player operating the controller 7. Further, by obtaining the distance realD as described above, a distance between the controller 7 and the markers 8L and 8R, i.e., a distance between the controller 7 and the speakers 2a respectively provided on the right and left sides of the monitor 2, can be calculated. Accordingly, the volume of sound from the speakers 2a may be adjusted based on the distance realD (for example, when the distance realD is lengthened, the volume of sound from the speakers 2a is turned up accordingly). This allows the volume of sound from the speakers 2a to be appropriately adjusted based on a viewing distance of the player using the controller 7.

Described below is another exemplary process using the position of the controller 7. When the game apparatus 3 executes a so-called vibration feedback game, an amplitude and/or a vibrational frequency of the vibrator 704 may be changed in accordance with the position of the controller 7. For example, when the angle δ2 or distance realD indicates that the controller 7 has approached a vibration source virtually displayed on the monitor 2, the game apparatus 3 increases the amplitude or vibrational frequency of the vibrator 704, thereby actuating the vibrator 704. As a result, vibration, which would be transmitted to the controller 7 if the controller 7 was near a real vibration source, is transmitted to the player's hand holding the controller 7. This allows the player to feel as if to have approached the real vibration source.

As described above, the position calculation apparatus according to certain exemplary embodiments is capable of precisely calculating a positional relationship between an image pickup device (controller 7) and imaging targets (e.g., markers 8L and 8R) by using a target image size of each imaging target in a taken image. For example, an angle at which the image pickup device is positioned with respect to a direction connecting the two imaging targets can be calculated. Further, even if the image pickup device is diagonally positioned with respect to the direction connecting the imaging targets, a distance between the image pickup device and the imaging targets can be precisely calculated. Still further, by performing a process in accordance with information indicating the positional relationship between the image pickup device and imaging targets, an operation based on the process can be performed, the operation using the position of the image pickup device. Consequently, a new manner of performing operation inputs is realized. For example, by obtaining information indicating a positional relationship between a game controller having an image pickup device and imaging targets, a game apparatus is enabled to perform a game process in accordance with the information, and a player operating the game controller is enabled to perform a new game operation in accordance with a position of the game controller.

In the above-described position calculation process, diameters of the markers 8L and 8R and diameters of target images of the markers 8L and 8R in a taken image are used. However, different size information may be used. The distance realD and angle δ2 may be calculated by using square measures of the markers 8L and 8R and square measures of the target images of the markers 8L and 8R in a taken image. Since shapes of the markers 8L and 8R are known information, required measurements (such as diameter and width) of the target images of the markers 8L and 8R can be calculated by using information indicating the square measures of the target images of the markers 8L and 8R. For this reason, even if the game apparatus 3 obtains information indicating only the square measures of the target images of the markers 8L and 8R, the information can be converted into information indicating diameters of the target images, and the above-described position calculation process can be performed by using the diameters.

Further, in the above-described position calculation process, the angle δ2 is used as a parameter indicating an angular position of the controller 7 with respect to the markers 8L and 8R. Alternatively, the angle δ1 (see FIG. 16) calculated at step 106 may be used. Still alternatively, an angle between the line connecting the controller 7 and marker 8R and the line connecting markers 8L and 8R may be calculated and used as the parameter indicating the angular position. Note that, the above-described manner of calculating a distance and angle is merely an example. Such a distance and angle may be calculated by a different calculation manner.

The above description has given an example in which information indicating the positional relationship between the image pickup device (controller 7) and the imaging targets is always used when the position calculation process is performed. Alternatively, the information may be used for the position calculation process only when a predetermined operation is performed (e.g., when the operation button 72i is pressed).

Further, in the above description, the controller 7 and the game apparatus 3 are connected by radio communication. However, the controller 7 and game apparatus 3 may be electrically connected by a cable. In such a case, the cable connected to the controller 7 is connected to a connecting terminal of the game apparatus 3.

Although the above description has given an example in which the receiving unit 6 connected to the connecting terminal of the game apparatus 3 is used as reception means for receiving transmission data wirelessly transmitted from the controller 7, a reception module provided within the game apparatus 3 may be used as the reception means. In this case, the transmission data received by the reception module is outputted to the CPU 30 via the predetermined bus.

Further, in the above description, the image data of the image taken by the image pickup element 743 is analyzed to obtain the size, position coordinates, center of gravity coordinates and the like of each of the infrared lights emitted from the markers 8L and 8R. The process result data indicating such coordinates and the like is generated by the controller 7, and transmitted to the game apparatus 3. However, data, which can be obtained in the middle of a process performed by the controller 7 for generating the process result data, may be transmitted from the controller 7 to the game apparatus 3. For example, the image data of the image taken by the image pickup element 743 may be transmitted from the controller 7 to the game apparatus 3, and the process result data may be obtained as a result of analyzing the image data at the CPU 30. In this case, the image processing circuit 744 provided within the controller 7 is no longer necessary. Alternatively, data as a result of partly analyzing the image data may be transmitted from the controller 7 to the game apparatus 3. For example, data indicating a brightness, position, and the like obtained from partly performing the analysis of the image data may be transmitted from the controller 7 to the game apparatus 3, and the rest of the analysis may be performed by the CPU 30 to obtain the process result data.

Still further, in the above description, the infrared lights from the markers 8L and 8R are the imaging targets of the image information calculation section 74 of the controller 7. However, a different object may be used as an imaging target. For example, more than three markers may be placed in the vicinity of the monitor 2, and infrared lights emitted therefrom may be used as imaging targets of the image information calculation section 74.

It is understood that the shapes of the controller 7 and the operation sections 72 mounted thereon, the number of operation sections 72, the positions in which the operation sections 72 are provided and the like in the above description are merely examples. The certain exemplary embodiments described herein can be realized even if these shapes, numbers, positions and the like are different from the above description. Also, the position of the image information calculation section 74 of the controller 7 (an entrance through which a light is incident on the imaging information calculation section 74) is not necessarily on the front face of the housing 71. The image information calculation section 74 may be provided on any other face of the housing 71 such that the image calculation section 74 externally receives a light.

Although the game apparatus 3 is operated by the controller 7 in this exemplary embodiment, the game apparatus 3 may be a general information processing apparatus such as a personal computer which is operated by an input device having image pickup means. In such a case, a program executed by a computer of the general information processing apparatus is not limited to a game program typically used for playing a game. The executed program may be an all-purpose image processing program which is used for image processing by the general information processing apparatus.

The position calculation apparatus, the storage medium storing the position calculation program, the game apparatus and the storage medium storing the game program according to certain exemplary embodiments are capable of precisely calculating, e.g., a positional relationship between an image pickup device and imaging targets, and are useful to perform a process for performing an operation using the positional relationship.

While certain exemplary embodiments have been described in detail, the foregoing detailed description is in all aspects illustrative and not restrictive. It is understood that numerous other modifications and variations can be devised without departing from their scope.

What is claimed is:

1. A position calculation apparatus for calculating a positional relationship between at least one of first and second imaging targets, and an image pickup device for taking images of the first and second imaging targets, the position calculation apparatus comprising:
    target image size obtaining programmed logic circuitry configured to obtain a first size, which indicates a size of a target image of the first imaging target in the image taken by the image pickup device, and a second size, which indicates a size of a target image of the second imaging target in the image taken by the image pickup device; and
    a positional relationship calculator configured to, based on the first and second sizes, calculate the positional relationship between the image pickup device and the at least one of the imaging targets.

2. The position calculation apparatus according to claim 1, wherein
    the positional relationship calculator includes an imaging target distance calculator configured to, based on the first size and an actual size of the first imaging target which corresponds to the first size, calculate a first distance between the image pickup device and the first imaging target, and configured to, based on the second size and an actual size of the second imaging target which corresponds to the second size, calculate a second distance between the image pickup device and the second imaging target, and based on the first and second distances and an actual setting distance between the first and second imaging targets, the positional relationship calculator calculates, as the positional relationship between the image pickup device and the at least one of the imaging targets, a positional relationship between the image pickup device and a predetermined point between the first and second imaging targets.

3. The position calculation apparatus according to claim 2, wherein the positional relationship calculator calculates, as the positional relationship, a distance between the image pickup device and a middle point between the first and second imaging targets.

4. The position calculation apparatus according to claim 2, wherein the positional relationship calculator calculates, as the positional relationship, a placement direction which is a direction from the image pickup device to a middle point between the first and second imaging targets.

5. The position calculation apparatus according to claim 2, wherein the positional relationship calculator calculates, as the positional relationship, a placement direction which is a direction from the image pickup device to one of the first and second imaging targets.

6. The position calculation apparatus according to claim 3, wherein the positional relationship calculator includes an angle calculator configured to, based on the first and second distances and the actual setting distance, calculate an angle between a line connecting the first and second imaging targets and a line connecting the first imaging target and the image pickup device, and based on the angle, the first distance and a half length of the actual setting distance, the positional relationship calculator calculates a distance between the middle point and the image pickup device.

7. The position calculation apparatus according to claim 6, wherein based on the first distance, the half length of the actual setting distance, and the distance between the middle point and the image pickup device, the positional relationship calculator further calculates, as the positional relationship, a placement angle which is an angle between the line connecting the first and second imaging targets and a line connecting the middle point and the image pickup device.

8. A game apparatus comprising:

the position calculation apparatus according to claim 1;

a game processor configured to, based on the positional relationship calculated by the positional relationship calculator, perform a predetermined game process for a virtual game world; and a display controller configured to sequentially cause a display device to display at least a portion of the virtual game world.

9. The game apparatus according to claim 8, wherein the game processor determines, based on the positional relationship, a position of a virtual camera placed in the virtual game world, and the display controller sequentially causes the display device to display at least the portion of the virtual game world whose image is taken by the virtual camera.

10. The game apparatus according to claim 8, wherein based on the positional relationship, the game processor determines a position of a predetermined object appearing in the virtual game world.

11. The game apparatus according to claim 8, wherein the image pickup device is provided in a single case together with a vibration generator for, when actuated, generating predetermined vibration, and the game processor controls, based on the positional relationship, the vibration generated by the vibration generator.

12. A game apparatus comprising:

the position calculation apparatus according to claim 4;

a game processor configured to perform a predetermined game process for a virtual game world; and a display controller configured to sequentially cause a display device to display at least a portion of the virtual game world, wherein the positional relationship calculator calculates placement directions for a plurality of image pickup devices, respectively, and the display controller divides a display area of the display device into a plurality of display areas, and based on the placement directions, allocates the plurality of display areas to the plurality of image pickup devices, respectively.

13. A game apparatus comprising:

the position calculation apparatus according to claim 5;

a game processor configured to perform a predetermined game process for a virtual game world; and a display controller configured to sequentially cause a display device to display at least a portion of the virtual game world, wherein the positional relationship calculator calculates placement directions for a plurality of image pickup devices, respectively, and the display controller divides a display area of the display device into a plurality of display areas, and based on the placement directions, allocates the plurality of display areas to the plurality of image pickup devices, respectively.

14. A game apparatus comprising:

the position calculation apparatus according to claim 7;

a game processor configured to perform a predetermined game process for a virtual game world; and a display controller configured to sequentially cause a display device to display at least a portion of the virtual game world, wherein the positional relationship calculator calculates placement angles for a plurality of image pickup devices, respectively, and the display controller divides a display area of the display device into a plurality of display areas, and based on the placement angles, allocates the plurality of display areas to the plurality of image pickup devices, respectively.

15. A game apparatus comprising:

the position calculation apparatus according to claim 1;

a game processor configured to perform a predetermined game process for a virtual game world;

a display controller configured to sequentially cause a display device to display at least a portion of a virtual game world; and a sound controller configured to cause a plurality of speakers to output sound in accordance with the predetermined game process performed by the game processor, wherein the sound controller controls, based on the positional relationship, volume of the sound outputted from the speakers.

16. A non-transitory computer-readable storage medium storing a position calculation program to be executed by a computer which calculates a positional relationship between at least one of first and second imaging targets, and an image pickup device for taking images of the first and second imaging targets, the position calculation program causing the computer to perform:
   a target image size obtaining of obtaining a first size, which indicates a size of a target image of the first imaging target in the image taken by the image pickup device, and a second size, which indicates a size of a target image of the second imaging target in the image taken by the image pickup device; and
   a positional relationship calculation of, based on the first and second sizes, calculating the positional relationship between the image pickup device and the at least one of the imaging targets.

17. The storage medium storing the position calculation program according to claim 16, wherein
   the positional relationship calculation includes an imaging target distance calculation of, based on the first size and an actual size of the first imaging target which corresponds to the first size, calculating a first distance between the image pickup device and the first imaging target, and, based on the second size and an actual size of the second imaging target which corresponds to the second size, calculating a second distance between the image pickup device and the second imaging target, and
   based on the first and second distances and an actual setting distance between the first and second imaging targets, the positional relationship calculation calculates, as the positional relationship between the image pickup device and the at least one of the imaging targets, a positional relationship between the image pickup device and a predetermined point between the first and second imaging targets.

18. The storage medium storing the position calculation program according to claim 17, wherein at the positional relationship calculation, a distance between the image pickup device and a middle point between the first and second imaging targets is calculated as the positional relationship.

19. The storage medium storing the position calculation program according to claim 17, wherein at the positional relationship calculation, a placement direction which is a direction from the image pickup device to a middle point between the first and second imaging targets is calculated as the positional relationship.

20. The storage medium storing the position calculation program according to claim 17, wherein at the positional relationship calculation, a placement direction which is a direction from the image pickup device to one of the first and second imaging targets is calculated as the positional relationship.

21. The storage medium storing the position calculation program according to claim 18, wherein
   the positional relationship calculation includes an angle calculation of, based on the first and second distances and the actual setting distance, calculating an angle between a line connecting the first and second imaging targets and a line connecting the first imaging target and the image pickup device, and
   at the positional relationship calculation, a distance between the middle point and the image pickup device is calculated based on the angle, the first distance, and a half length of the actual setting distance.

22. The storage medium storing the position calculation program according to claim 21, wherein at the positional relationship calculation, a placement angle, which is an angle between the line connecting the first and second imaging targets and a line connecting the middle point and the image pickup device, is further calculated, as the positional relationship, based on the first distance, the half length of the actual setting distance, and the distance between the middle point and the image pickup device.

23. A non-transitory computer-readable storage medium storing a game program for causing the computer according to claim 16 to perform:
   that which the position calculation program according to claim 16 causes the computer to perform;
   a game processing of, based on the positional relationship calculated at the positional relationship calculation, performing a predetermined game process for a virtual game world; and
   a display control of sequentially causing a display device to display at least a portion of the virtual game world.

24. The storage medium storing the game program according to claim 23, wherein
   at the game processing, a position of a virtual camera placed in the virtual game world is determined based on the positional relationship, and
   at the display control, the display device is sequentially caused to display at least the portion of the virtual game world whose image is taken by the virtual camera.

25. The storage medium storing the game program according to claim 23, wherein at the game processing, a position of a predetermined object appearing in the virtual game world is determined based on the positional relationship.

26. The storage medium storing the game program according to claim 23, wherein
   the image pickup device is provided in a single case together with a vibration generator for, when actuated, generating predetermined vibration, and
   at the game processing, the vibration generated by the vibration generator is controlled based on the positional relationship.

27. A non-transitory computer-readable storage medium storing a game program for causing the computer according to claim 19 to perform:
   that which the position calculation program according to claim 19 causes the computer to perform;
   a game processing of performing a predetermined game process for a virtual game world; and
   a display control of sequentially causing a display device to display at least a portion of the virtual game world, wherein
   at the positional relationship calculation, placement directions are calculated for a plurality of image pickup devices, respectively, and
   at the display control, a display area of the display device is divided into a plurality of display areas, and based on the placement directions, the plurality of display areas are allocated to the plurality of image pickup devices, respectively.

28. A non-transitory computer-readable storage medium storing a game program for causing the computer according to claim 20 to perform:
   that which the position calculation program according to claim 20 causes the computer to perform;
   a game processing of performing a predetermined game process for a virtual game world; and a display control of sequentially causing a display device to display at least a portion of the virtual game world, wherein at the positional relationship calculation, placement directions are calculated for a plurality of image pickup devices, respectively, and at the display control, a display area of the display device is divided into a plurality of display areas, and based on the placement directions, the plurality of display areas are allocated to the plurality of image pickup devices, respectively.

29. A non-transitory computer-readable storage medium storing a game program for causing the computer according to claim 22 to perform:

that which the position calculation program according to claim 22 causes the computer to perform;

a game processing of performing a predetermined game process for a virtual game world; and a display control of sequentially causing a display device to display at least a portion of the virtual game world, wherein at the positional relationship calculation, placement angles are calculated for a plurality of image pickup devices, respectively, and at the display control, a display area of the display device is divided into a plurality of display areas, and based on the placement angles, the plurality of display areas are allocated to the plurality of image pickup devices, respectively.

30. A non-transitory computer-readable storage medium storing a game program for causing the computer according to claim 16 to perform:

that which the position calculation program according to claim 16 causes the computer to perform;

a game processing of performing a predetermined game process for a virtual game world;

a display control of sequentially causing a display device to display at least a portion of a virtual game world; and a sound control of causing a plurality of speakers to output sound in accordance with the predetermined game process performed at the game processing step, wherein at the sound control, volume of the sound outputted from the speakers is controlled based on the positional relationship.

* * * * *